(12) United States Patent
Hattori et al.

(10) Patent No.: US 8,104,035 B2
(45) Date of Patent: Jan. 24, 2012

(54) PROGRAM FOR CONTROLLING A VIRTUAL COMPUTER AND COMPUTER SYSTEM FOR VIRTULIZATION TECHNOLOGY

(75) Inventors: Naoya Hattori, Hachioji (JP); Toshiomi Moriki, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1379 days.

(21) Appl. No.: 11/703,662

(22) Filed: Feb. 8, 2007

(65) Prior Publication Data

US 2007/0234358 A1    Oct. 4, 2007

(30) Foreign Application Priority Data

Mar. 31, 2006    (JP) .................. 2006-097594

(51) Int. Cl.
*G06F 9/455*    (2006.01)
*G06F 9/46*    (2006.01)

(52) U.S. Cl. .................... 718/1; 718/108
(58) Field of Classification Search ............ 718/1
See application file for complete search history.

(56) References Cited

U.S. PATENT DOCUMENTS

| | | | |
|---|---|---|---|
| 4,887,202 A | 12/1989 | Tanaka et al. | |
| 6,397,242 B1 | 5/2002 | Devine et al. | |
| 6,671,877 B1 | 12/2003 | Ogasawara | |
| 2008/0215796 A1* | 9/2008 | Lam et al. | 711/100 |

FOREIGN PATENT DOCUMENTS

| | | |
|---|---|---|
| JP | 62031437 | 2/1987 |
| JP | 01243155 | 9/1989 |
| JP | 2000222221 | 8/2000 |

OTHER PUBLICATIONS

Intel® Vanderpool Technology for IA-32 Processors (VT-x) Preliminary Specification, Intel Corporation, Jan. 2005.
Vanderpool Technology for the Intel® Itanium® Architecture (VT-i) Preliminary Specification, Revision 1.0, Intel Corporation, Jan. 2005, pp. 11-12, 20.
Intel® Virtualization Technology Specification for the IA-32 Intel® Architecture, Intel Corporation, Apr. 2005.
Intel® Virtualization Technology Specification for the Intel® Itanium® Architecture (VT-i), Revision 2.0, Apr. 2005.
Japanese Office Action, dispatched Nov. 29, 2011 for corresponding Japanese Patent Application No. 2006-097594.

* cited by examiner

*Primary Examiner* — Kenneth Tang
(74) *Attorney, Agent, or Firm* — Brundidge & Stanger, P.C.

(57) ABSTRACT

Provided is the virtual computer system including an emulation module for emulating an operation based on an operation code for executing the operation of hardware of a server system, an exception event handler module for calling the emulation module when an exception event is generated by a CPU, a code management module for managing a promotion code for emulating the operation of the hardware of the server system, a frequency judgment module for judging whether a frequency of the operation of the hardware of the server system is high, and a switching module for determining whether to call the emulation module by the exception event handler module or to call the emulation module by executing the promotion code based on the judged frequency. Accordingly, the virtual computer system can simultaneously achieve high performance and memory saving in an emulation system.

21 Claims, 31 Drawing Sheets

CODE CONVERSION SETTING TABLE — 95

| GUEST IDENTIFICATION NUMBER | UPPER LIMIT OF MEMORY AMOUNT TO BE USED | FREQUENCY THRESHOLD VALUE |
|---|---|---|
| 0 | 16M BYTE | 100 |
| 1 | 32M BYTE | 40 |
| : | : | : |
| : | : | : |

HW OPERATION FREQUENCY TABLE 72

| GUEST IDENTIFICATION NUMBER | ADDRESS OF GUEST CODE PHYSICAL PAGE | NUMBER OF HW OPERATION EXECUTION TIMES |
|---|---|---|
| 0 | 0x00000000 | 100 |
| 0 | 0x00001000 | 0 |
| : | : | : |
| : | : | : |

CONVERSION CODE MANAGEMENT TABLE — 35

| GUEST IDENTIFICATION NUMBER | ADDRESS OF GUEST CODE PHYSICAL PAGE | valid | ADDRESS OF CONVERSION CODE PHYSICAL PAGE |
|---|---|---|---|
| 0 | 0x00000000 | 1 | 0xF0001000 |
| 0 | 0x00001000 | 0 | - |
| : | : | : | : |
| : | : | : | : |

| SETTING OF CODE CONVERSION | | | |
|---|---|---|---|
| | GUEST IDENTIFICATION NUMBER | UPPER LIMIT OF MEMORY AMOUNT TO BE USED | INSTRUCTION TYPE LIST |
| | 0 | 16M BYTE | TYPE #0,#1··· |
| | 1 | 32M BYTE | TYPE #0,#1··· |
| | : | : | : |
| | : | : | : |

| HW OPERATION FREQUENCY TABLE | | |
|---|---|---|
| GUEST DENTIFICATION NUMBER | INSTRUCTION TYPE | FREQUENCY FLAG |
| 0 | TYPE #0 | 1 ( HIGH FREQUENCY ) |
| 0 | TYPE #2 | 0 ( LOW FREQUENCY ) |
| : | : | : |
| : | : | : |

*FIG. 16*

HW OPERATION FREQUENCY TABLE — 72

| GUEST IDENTIFICATION NUMBER | valid | ADDRESS OF GUEST CODE PHYSICAL PAGE |
|---|---|---|
| 0 | 1 | 0x000003FC |
| 0 | 1 | 0x0000123E |
| 0 | 0 | — |
| : | : | : |

HW OPERATION HISTORY TABLE

| GUEST IDENTIFICATION NUMBER | CPU IDENTIFICATION NUMBER | OPERATION SUBJECT | PHYSICAL ADDRESS OF GUEST CODE | TIME INFORMATION |
|---|---|---|---|---|
| 0 | 0 | OS | 0x0000010F6 | 7000 |
| 1 | 0 | AP | 0xFFFFFFFE | 25000 |
| : | : | : | : | : |
| : | : | : | : | : |

| EMULATION SYSTEM TABLE | | |
|---|---|---|
| GUEST IDENTIFICATION NUMBER | CPU IDENTIFICATION NUMBER | TYPE OF EMURATION |
| 0 | 0 | CODE CONVERSION SYSTEM |
| 0 | 0 | VT SYSTEM |
| : | : | : |
| : | : | : |

CONVERSION CODE MANAGEMENT TABLE

| GUEST IDENTIFICATION NUMBER | PHYSICAL ADDRESS OF GUEST CODE | valid | PHYSICAL ADDRESS OF CONVERSION CODE |
|---|---|---|---|
| 0 | 0x000003FC | 1 | 0xF0001524 |
| 0 | 0x0000123E | 0 | 0xF000809A |
| : | : | : | : |
| : | : | : | : |

PROGRAM FOR CONTROLLING A VIRTUAL COMPUTER AND COMPUTER SYSTEM FOR VIRTULIZATION TECHNOLOGY

CLAIM OF PRIORITY

The present application claims priority from Japanese application JP 2006-97594 filed on Mar. 31, 2006, the content of which is hereby incorporated by reference into this application.

BACKGROUND OF THE INVENTION

This invention relates to a virtual computer system realized in a server system, and more particularly, to a virtual computer system enabling higher efficiency of hardware emulation carried out by a virtual machine monitor.

As an operation becomes more complex along with an increase in the number of servers included in an IT system, operation costs become a problem. To reduce the operation costs, server integration which integrates a plurality of servers into one server has been known. As a technique for realizing the server integration, a virtual computer technique which logically divides one computer at an optional ratio has been known.

According to the virtual computer technique, for example, firmware or middleware, such as a hypervisor, divides a physical computer into a plurality of logical partitions (LPAR), and allocates computer resources (CPU, main memory, and I/O) to each divided LPAR. An operating system (OS) is operated on this LPAR. Additionally, one host OS (OS which directly uses the physical computer) is executed in one server, and a hypervisor operated on the host OS similarly divides the physical computer into LPAR's. A guest OS (OS operated on LPAR) may be operated on each LPAR.

Thus, the virtual computer technique enables an OS conventionally operated in a plurality of servers and software operated on the OS to be operated in one server. Accordingly, the server integration is realized.

The virtual computer technique is a technique conventionally used in a large computer such as a mainframe. With a recent increase in performance of a microprocessor, however, the virtual computer technique can be applied to a low-end server or a personal computer.

By applying the virtual computer technique, the physical computer constitutes a virtual computer system which includes a plurality of virtual machines for operating a guest (generic term of guest OS and application software operated on the guest OS) and a virtual machine monitor (referred to as VMM hereinafter) for controlling the virtual machines (refer to U.S. Pat. No. 6,397,242).

The OS is originally prepared on the premise of exclusively using all pieces of hardware of the server. A plurality of guest OS's are operated in the virtual computer system. However, the guest OS cannot exclusively use the hardware of the server. Accordingly, the VMM emulates the same activity as that in a state where the guest OS monopolizes the hardware of the server, corresponding to a hardware operation by the guest OS.

The VMM uses time and memory for the emulation processing. Thus, when a number of emulation times by the VMM is increased by the guest OS, processing time and an amount of used memory increase to deteriorate guest performance, creating a problem of a reduction in a memory amount usable by the guest. To mitigate the problem, a technique of achieving high-speed emulation (high performance) and a memory saving technique have been invented.

One of the high-speed emulation technique is a code conversion system. According to the code conversion system, the VMM creates a conversion code corresponding to an operation code (or OS code) of the guest OS in the memory. The conversion code creation processing is called code conversion. When the conversion code is created, a hardware operation included in the corresponding OS code is replaced with an emulation code. According to the code conversion system, by executing the code conversion in place of the OS code, the hardware operation can be emulated with minimum necessary processing. The code conversion system executes code conversion for all the OS codes necessary for execution. The code conversion may cause a speed reduction as it requires processing time. Thus, according to this system, the speed reduction is prevented by continuously holding the created conversion code in the memory and reusing the conversion code of the memory from second time and after. However, when the memory for holding the conversion code becomes short, conversion codes of a low execution frequency are discarded as all the conversion codes cannot be held therein.

A virtualization technology (referred to as VT hereinafter) system that is a memory saving emulation technique uses a VT function mounted on a CPU made by Intel Corporation. When the VT function is used, a hardware operation full-inhibition mode which inhibits execution of all hardware operation codes can be selected as a CPU operation mode. When execution of the hardware operation codes is tried while the CPU is in the hardware operation full-inhibition mode, the CPU generates an exception event to forcibly interrupt the code execution. In this case, the CPU shifts to a hardware operation permission mode which permits the hardware operation to execute codes registered beforehand. On the other hand, when resumption processing from the exception event is executed in the hardware operation permission mode, the CPU shifts to the hardware operation full-inhibition mode to resume execution from a designated address (refer to Intel Itanium Architecture Software Developer's Manual Volume 2, and Intel 64 and IA-32 Architecture Software Developer's Manual Volume 3).

According to this system, an emulation module for executing the emulation processing is registered in the CPU beforehand, and the guest is executed in the hardware operation full-inhibition mode to emulate the hardware operation. In this system, as the memory of the VMM holds only the emulation module and data used for the emulation, a memory use amount of the VMM is small.

SUMMARY OF THE INVENTION

The code conversion system and the VT system of the background art respectively have the following problems.

In a case of the code conversion system having high performance, as the OS codes necessary for execution are all converted, a memory amount used for holding the conversion codes is large, and thus, memory saving is impossible. When the memory amount is forcibly reduced to save the memory, reutilization of the conversion codes does not function satisfactorily, causing an increase in a number of code conversion times to incur performance deterioration. Thus, high performance is impossible.

In a case of the VT system, an exception event is always generated at a time of starting the emulation. However, as the current CPU executes high-level parallel operations presuming that no exception event is generated, the CPU must execute complex processing such as validity judgment of an internal state, instruction discarding, or instruction re-execution when an exception event is generated. Thus, processing is delayed when the exception event is generated. Hence, in the case of the VT system, high performance is impossible while the memory is saved.

As described above, according to the conventional techniques, only one of the high performance and the memory saving is achieved. There is a trade-off relation between the high performance and the memory saving, which implies that both conditions cannot be achieved simultaneously.

This invention has been made in view of the aforementioned problem, and it is an object of this invention to provide a virtual computer system capable of simultaneously achieving high performance and memory saving when hardware emulation is carried out.

According to this invention, a guest program code is classified into two portions according to an execution frequency of an HW operation. A code conversion system is applied to a portion of a high execution frequency, while a VT system is applied to a portion of a low execution frequency.

According to this invention, the guest code is classified into the portion including a hardware operation code of a high frequency, and the other, i.e., the portion including a hardware operation code of a low frequency. The code conversion system is applied to emulation of the hardware operation code of the high frequency while the VT system is applied to emulation of the hardware operation code of the low frequency. Thus, it is possible to realize the virtual computer system which can simultaneously achieve high performance and memory saving.

BRIEF DESCRIPTION OF THE DRAWINGS

FIG. 3 is an explanatory diagram showing an example of a code conversion setting table according to the first embodiment.

FIG. 5 is an explanatory diagram showing an example of the HW operation frequency table according to the first embodiment.

FIG. 6 is an explanatory diagram showing an example of the conversion code management table according to the first embodiment.

FIG. 15 is an explanatory diagram of a code conversion setting table according to the second embodiment.

FIG. 16 is an explanatory diagram showing an HW operation frequency table according to the second embodiment.

FIG. 21 is an explanatory diagram showing an example of the HW operation frequency table according to the third embodiment.

FIG. 22 is an explanatory diagram showing an example of the HW operation frequency table according to the third embodiment.

FIG. 24 is an explanatory diagram showing an example of the emulation system table according to the third embodiment.

FIG. 25 is an explanatory diagram showing an example of the conversion code management table according to the third embodiment.

DETAILED DESCRIPTION OF THE PREFERRED EMBODIMENTS

Preferred embodiments of this invention will be described below referring to the accompanying drawings.

First Embodiment

Figure 1:
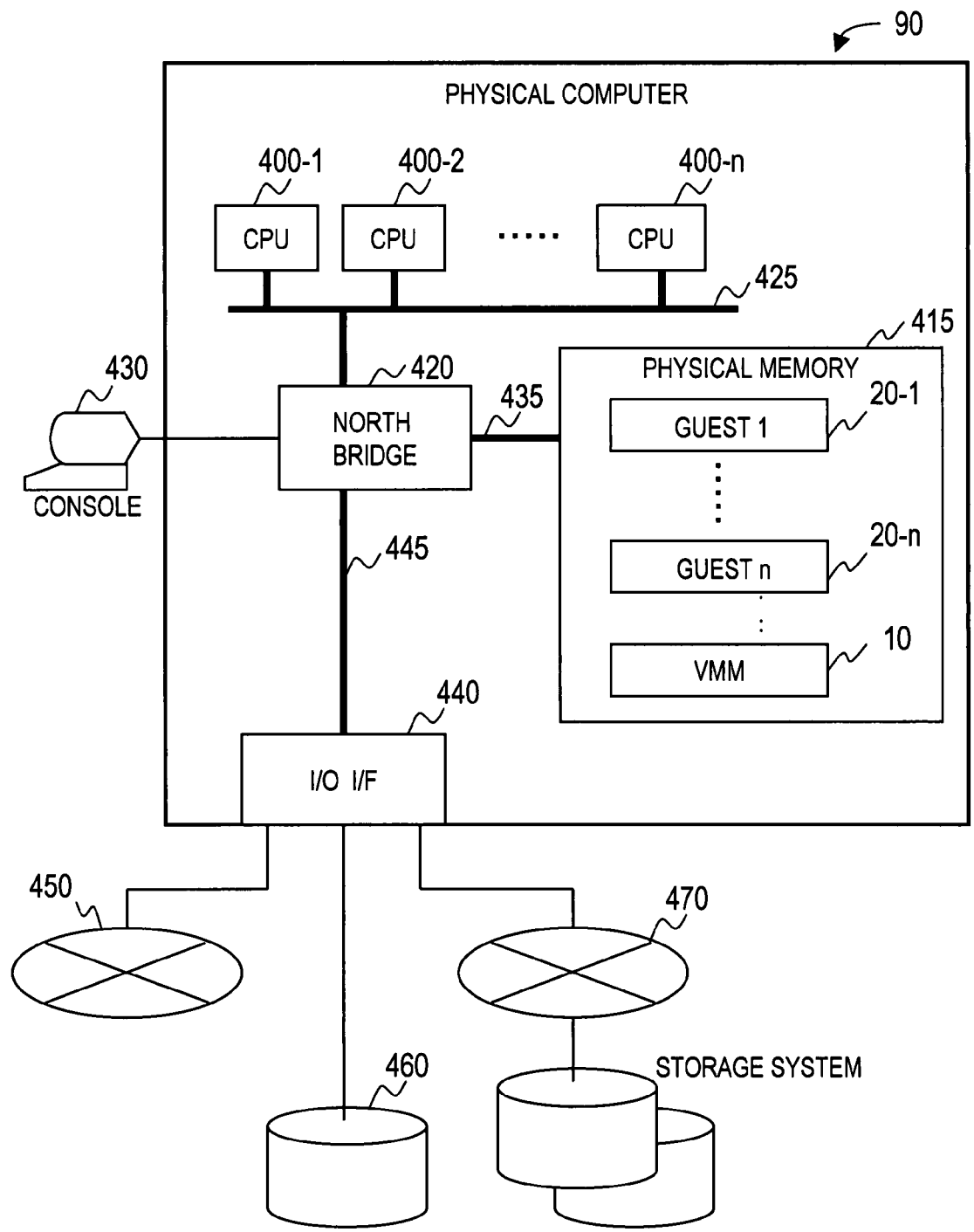
FIG. 1 is a block diagram of a physical computer where a virtual computer system is operated according to the first embodiment.

FIG. 1 is a block diagram showing a physical computer according to a first embodiment of this invention.

FIG. 1 shows a configuration of a physical computer 90 where a virtual computer system is operated.

The physical computer 90 includes one or more CPU's 400 (400-1 to 400-*n*). Those CPU's 400 are connected to a north bridge 420 via a front side bus 425.

The north bridge 420 is connected to a physical memory 415 via a memory bus 435, and to an I/O interface 440 via a bus 445. The north bridge 420 is also directly connected to a consol 430.

The I/O interface 440 is connected to I/O devices provided outside the physical computer 90 to transmit/receive data to/from the I/O devices. In an example of FIG. 1, the I/O interface 440 is connected to a network adaptor 451 connected to a LAN 450, a SCSI adaptor 461 connected to a disk device 460, and a fibre channel adaptor 471 connected to a storage area network (SAN) 470.

The CPU 400 accesses a physical memory 415 via the north bridge 420, and executes a program stored in the physical memory 415 to execute processing defined by the program. The CPU 400 accesses the I/O devices provided outside the physical computer 90 via the north bridge 420 and the I/O interface 440.

The north bridge 420 controls inputting/outputting of data to/from the host physical memory 415. The north bridge 420 includes a graphic controller, and displays images or data in the console 430.

The physical memory 415 stores a program for realizing a virtual machine monitor ("VMM" hereinafter) 10 and guests 20 (20-1 to 20-n). The CPU executes the program to execute the VMM 10, and the guests 20 are executed by the VMM 10.

The CPU's 400 (400-1 to 400-n) are itanium processor family (IPF) processors equipped with VT-I functions. The CPU 400 is operated in an HW operation full-inhibition mode when a VM bit of a processor status register (PSR) among registers of the CPU 400 is 1. When the VM bit of the PSR is 0, and a current privilege level (CPL) field of the PSR is 0, the CPU 400 is operated in a hardware operation permission mode. When none of those conditions are satisfied, the CPU 400 is operated in a hardware operation partial-inhibition mode.

The CPU 400 includes an instruction address conversion mechanism for converting virtual and physical addresses of an instruction. The instruction address conversion mechanism uses an instruction translation lookaside buffer (TLB). The CPU 400 may combine the instruction TLB with an instruction page table to realize the address conversion mechanism.

Next, the virtual computer system of this embodiment will be described.

Figure 2:
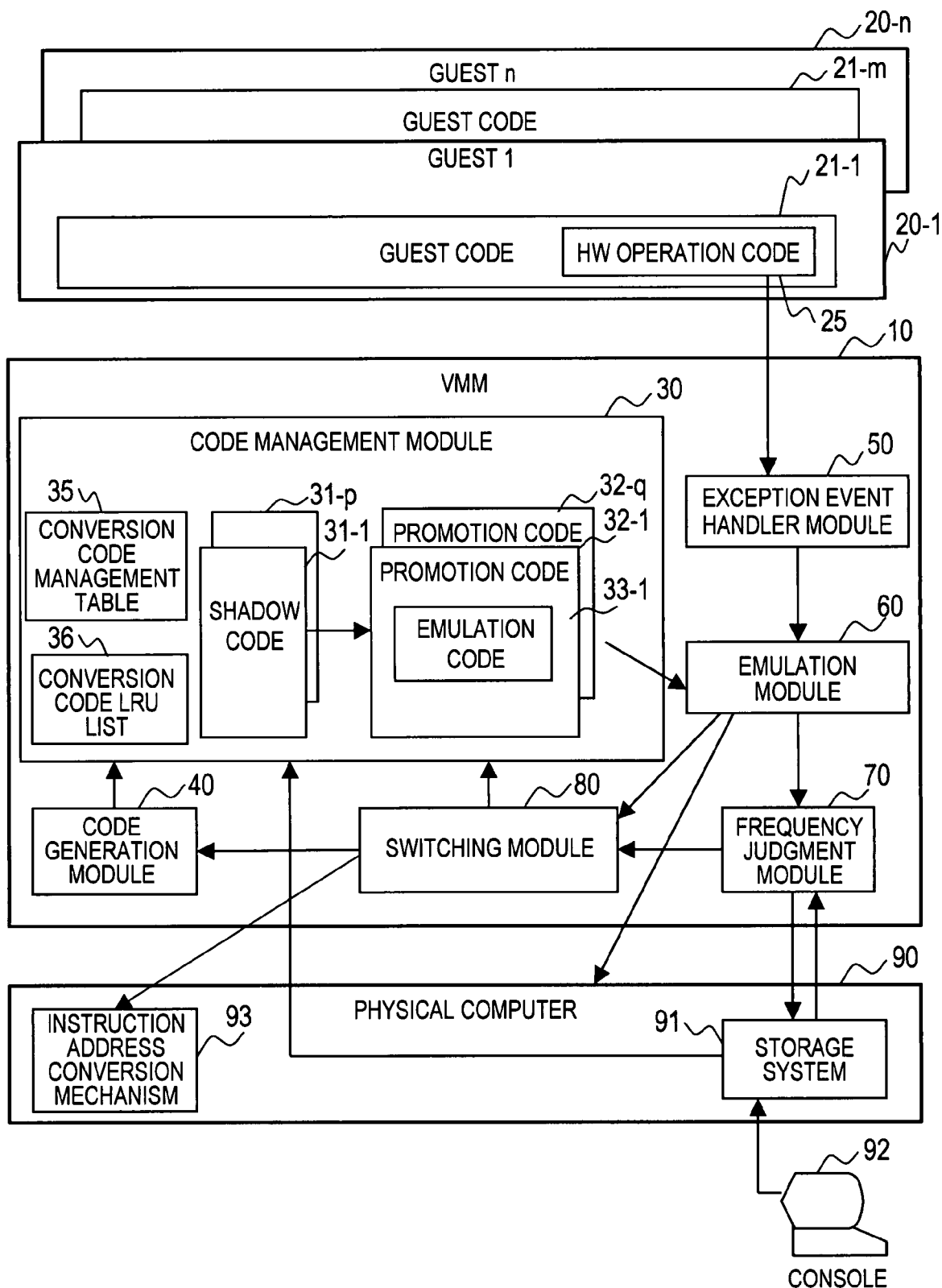
FIG. 2 is a block diagram of hardware and software in the physical computer according to the first embodiment.

FIG. 2 is a block diagram of hardware and software including the guests 20 (20-1 to 20-n) and the VMM 10 for operating the guests 20 in the physical computer 90.

In FIG. 2, the VMM 10 is operated to manage the plurality of guests 20 (20-1 to 20-n) in the physical computer 90. The VMM 10 emulates hardware operations ("HW operation" hereinafter) executed by the plurality of guests 20.

Each guest 20 includes one or more guest codes 21 (21-1 to 21-m) necessary for an operation. This guest code 21 includes an HW operation code 25.

The VMM 10 includes a code management module 30, a code generation module 40, an exception event handler module 50, an emulation module 60, a frequency judgment module 70, and a switching module 80.

Processing of the VMM 10 when the guest 20 executes the guest code including the HW operation code will be described.

The VMM 10 executes the guest code 21 in the HW operation full-inhibition mode. When the guest 20 executes the guest code 21 including the HW operation code, the CPU 400 generates an exception event. After the CPU 4 shifts to the HW operation permission mode, the exception event handler module 50 of the VMM 10 is executed.

The exception event handler module 50 analyzes a cause of a generated exception event, and calls the emulation module 60 corresponding to the exception event, i.e., an HW operation code.

The emulation module 60 operates the physical computer 90 when necessary. Accordingly, emulation corresponding to the HW operation code is executed. The emulation module 60 calls the frequency judgment module 70 when the emulation is executed.

The frequency judgment module 70 judges a frequency of HW operations for each address group, and passes a result of the judgment to the switching module 80.

A predetermined address range including an instruction address of the HW operation code is named an address group. According to the embodiment, a page is used for the address group.

When necessary during module initialization or the like, the frequency judgment module 70 refers to a storage system 91 of the physical computer 90 to obtain system switching conditions stored in the storage system 91.

The switching module 80 obtains a frequency of HW operations for each page from the frequency judgment module 60. When a frequency is judged to be high, the code management module 30 is requested to retrieve a conversion code corresponding to the HW operation.

The code management module 30 manages conversion codes. The code management module 30 includes a conversion code management table 35 and a conversion code least recent used (LRU) list 36. The conversion code management table 35 holds information for retrieving a conversion code. The conversion code LRU list 36 holds information on a conversion code of long unused time.

The switching module 80 calls the code generation module 40 when the conversion code management table 35 includes no information recorded corresponding to a page including an address of the HW operation code as a result of the request to the code management module 30.

The code generation module 40 refers to the page including the address of the HW operation code to generate pluralities of corresponding shadow codes 31 (31-1 to 31-p) and promotion codes 32 (32-1 to 32-q) in a memory managed by the code management module 30. Then, contents thereof are stored in the conversion code management table 35.

Subsequently, the switching module 80 sets correspondence between a virtual address of the page and a physical address of a shadow code 31 in an instruction address conversion mechanism 93 of the physical computer 90.

Through the aforementioned operation, when the page including the address of the HW operation code of the guest 20 is executed, the shadow code 31 is executed.

The VMM 10 executes "rfi instruction" to return the operation mode of the CPU to the HW operation full-inhibition mode at the last of the series of processings. Accordingly, the shadow code is executed in the HW operation full-inhibition code as in the case of the guest code.

The shadow code 31 calls the promotion code 32 in place of the HW operation code.

The promotion code 32 shifts the CPU to the HW operation permission code to call the emulation module 60. Alternatively, an emulation code 33 (33-1) that is a partial copy of the emulation module 60 is executed. Thus, emulation of an HW operation is executed. Subsequently, the CPU is returned to the HW operation full-inhibition mode.

To shift the CPU to the HW operation permission mode, the promotion code 32 includes "vmsw. 0" and "vmsw. 1" which are instructions to operate VM bits of the PSR.

A guest code 21 corresponding to the shadow code 31 may be rewritten by the guest 20. When the rewriting is detected, the emulation module 60 notifies the rewriting to the frequency judgment module 70 and the switching module 80. The frequency judgment module 70 sets a frequency of a rewritten page to "low frequency". The switching module 80 invalidates a conversion code corresponding to the rewritten page to record it in the conversion code management table 35.

In addition, setting regarding the rewritten page is deleted from the instruction address conversion mechanism 93 of the physical computer 90.

The physical computer 90 is connected to a console 92. When a system administrator uses the console 92 to change a setting of code conversion, contents thereof are recorded in the storage system 91 which stores the setting of code conversion. The contents are also transferred to the frequency judgment module 70 and the code management module 30.

FIG. 3 is an explanatory diagram showing an example of a code conversion setting table 95 stored in the storage system 91.

The code conversion setting table 95 stores an upper limit of a memory amount used by the guest and a threshold value of a frequency for judging whether a guest code of the guest is a high/low frequency for each guest 20.

The code conversion setting table 95 includes a guest identification number field 501, an upper limit field 520 of a memory amount to be used, and a frequency threshold value field 521.

The guest identification number field 501 stores a guest identification number which is an identifier added to each guest 20. The upper limit field 520 of a memory amount to be used stores an upper limit of a memory amount used for holding a memory conversion code. The frequency threshold value field 521 stores a threshold value for judging whether a guest code is a high/low frequency.

Figure 4:
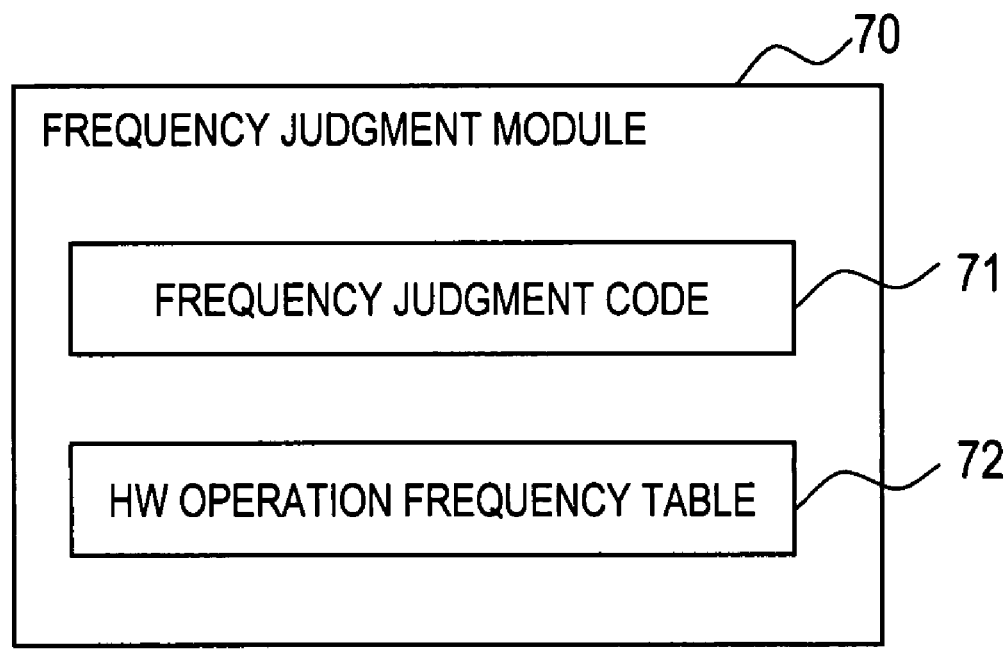
FIG. 4 is a block diagram showing a configuration of the frequency judgment module according to the first embodiment.

FIG. 4 is a block diagram showing a configuration of the frequency judgment module 70.

The frequency judgment module 70 includes a frequency judgment code 71 and an HW operation frequency table 72.

The frequency judgment code 71 is a program for referring to/updating the HW operation frequency table 72 to judge a frequency of HW operations. The HW operation frequency table 72 is a table for storing the number of times of HW operations executed by the guest 20 by a physical page unit of a guest code.

FIG. 5 is an explanatory diagram showing an example of the HW operation frequency table 72.

The HW operation frequency table 72 stores a physical page address of the guest code and the number of execution times of HW operations of the page for each guest 20.

The HW operation frequency table 72 includes a guest identification number field 501, an address field 503 of a physical page of the guest code, and a field 506 of the number of execution times of HW operations.

The guest identification number field 501 stores the same guest identification number as that of the code conversion setting table 95. The address field 503 of the physical page of the guest code stores an address of the physical page of the guest code. The field 506 of the number of execution times of HW operations stores the number of times of executing HW operations corresponding to the physical page of the guest code. An initial value of the number of execution times of HW operations is 0.

FIG. 6 is an explanatory diagram showing an example of the conversion code management table 35.

The conversion code table 35 stores a physical page address of the guest code, and an address of a physical page of a conversion code corresponding to the guest code.

The conversion code management table 35 includes a guest identification number field 501, an address field 503 of the guest code physical page, a valid bit field 504, and an address 505 of the physical page of the conversion code.

The guest identification number field 501 stores the same guest identification numbers as those of the code conversion table 95 and the HW operation frequency table 70. The address field 503 of the guest code physical page stores the same address of the physical page of the guest code as that of the HW operation frequency table 72. The valid bit field 504 stores a valid bit which is an identifier for indicating whether a conversion code corresponding to the page is valid. An initial value of the valid bid is 0 (invalid). The address field 505 of the physical page of the conversion code stores an address of a physical page of the conversion code corresponding to the address of the physical page of the guest code.

Figure 7:
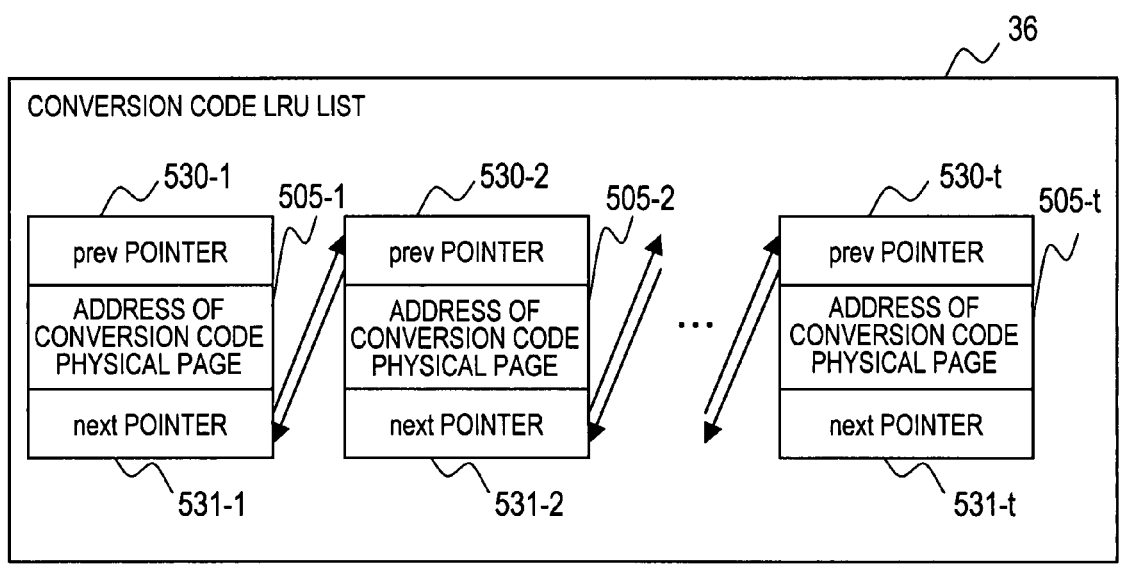
FIG. 7 is an explanatory diagram showing an example of the conversion code LRU list according to the first embodiment.

FIG. 7 is an explanatory diagram showing an example of the conversion code LRU list 36.

The conversion code LRU list 36 is a two-way linear list for holding addresses of conversion code physical pages in order of short unused time.

The conversion code LRU list 36 is prepared by setting "prev" pointer fields 530 (530-1 to 530-$t$), address fields 505 (505-1 to 505-$t$) of physical pages of conversion codes, and next pointer fields 531 (531-1 to 531-$t$) as elements, and combining these elements through pointers.

The prev pointer field 530 stores prev pointers indicating a previous element. The next pointer field 531 stores a next pointer indicating a next element. The address field 505 of the physical page of the conversion code stores the same address of the physical page of the conversion code as that of the conversion code management table 35.

Referring to a flowchart, processing of the VMM 10 executed in association with the operation of the guest 20 will be described below.

Figure 8:
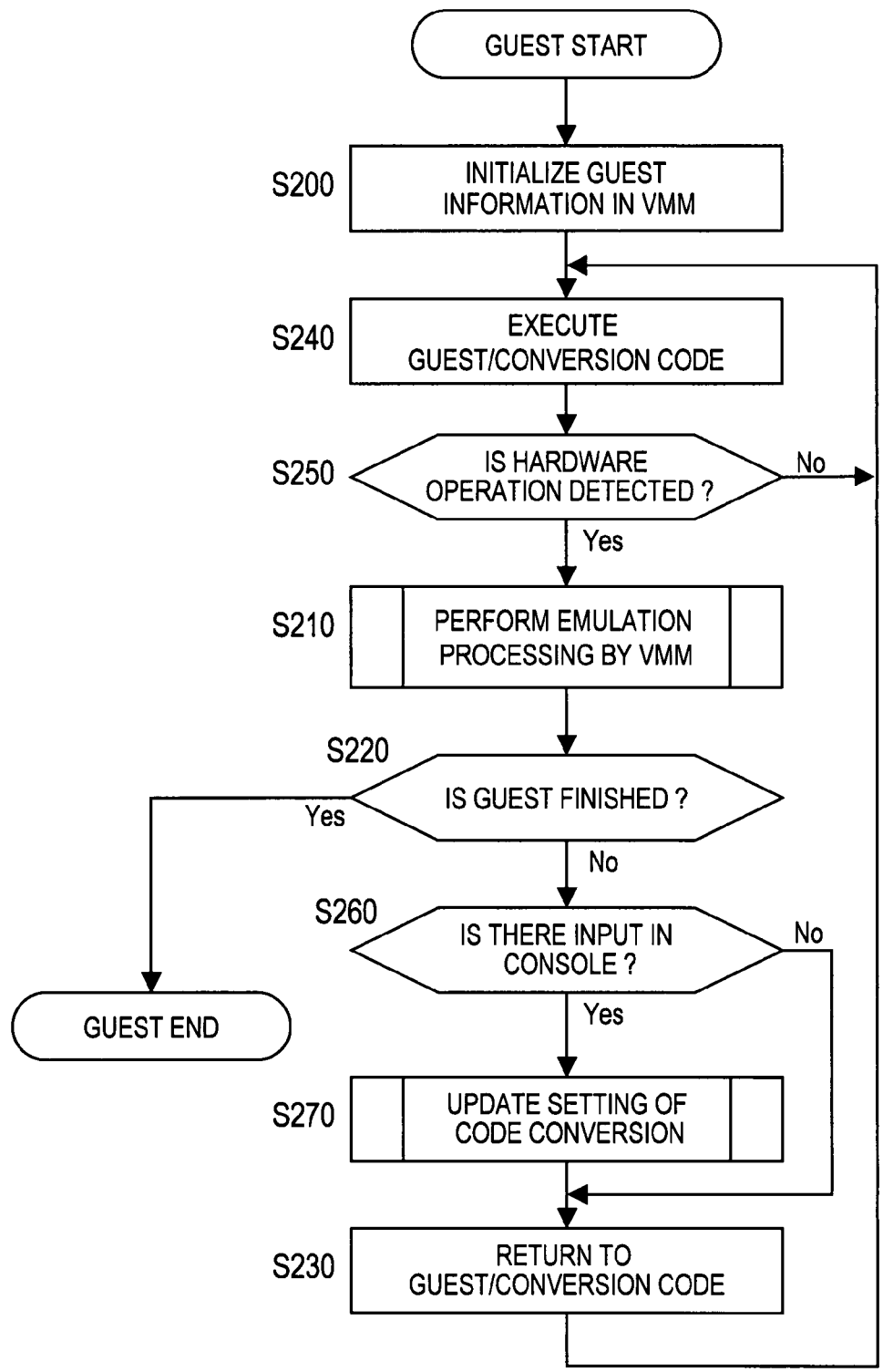
FIG. 8 is a flowchart of processing when the VMM operates the guest according to the first embodiment.

FIG. 8 is a flowchart of processing when the VMM 10 operates the guest 20.

First, at power-on or the like of the virtual computer to activate the guest 20, the VMM 10 refers to guest information, which the VMM 10 has, to initialize an entry regarding the activated guest (S200).

Then, the guest 20 executes a guest code or a conversion code in the HW operation full-inhibition mode (S240). Through execution of the guest code by the guest 20, the VMM 10 judges whether execution of an HW operation code has been detected (S250).

If it is judged that the execution of the HW operation code by the guest 20 has been detected, the VMM 10 generates an exception event to shift an operation mode of the CPU 400 to the HW operation permission mode. Subsequently, the process proceeds to Step S210. Similarly, if it is judged that execution of a promotion code by the guest 20 has been detected and the emulation module 60 has been called, the VMM 10 shifts the operation mode of the CPU to the HW operation permission mode. Then, the process proceeds to S210. On the other hand, if the VMM 10 judges that execution of the HW operation code or the promotion code has not been detected, the process returns to Step S240 to wait for detection of execution of a next guest code.

In Step S210, the VMM 10 executes emulation processing of an HW operation. Through the emulation processing, a type of a code to be executed next is determined.

Next, the VMM 10 judges whether the guest 20 has been finished by power cutting-off or the like of the virtual computer. If the end of the guest 20 is judged, the VMM 10 finishes the processing of the guest 20. On the other hand, if it is judged that the guest 20 has not been finished but the operation continues, the process proceeds to Step S260.

In Step S260, the VMM 10 judges whether a setting change of code conversion by the system administrator has been input to the console 92. If it is judged based on the input to the console 92 that the setting 95 of the code conversion has been changed, the process proceeds to Step S270. On the other hand, if the setting 95 of the code conversion has not been changed, the process proceeds to Step S230.

In Step S270, the physical computer 90 receives contents set by the console 92 to execute setting update processing of the code conversion for updating the setting 95 of the code conversion of the storage system 91.

Then, the VMM 10 sets a type of the code determined in Step S210. In other words, to return to the guest code or the shadow code, the VMM 10 executes an instruction of shifting the CPU operation mode to the HW operation full-inhibition mode. Subsequently, the process returns to Step S240. To return to the promotion code, the process directly returns to Step S240 without performing any processing. Then, an instruction contained in the promotion code is executed to shift the CPU operation mode to the HW operation full-inhibition mode.

Figure 9:
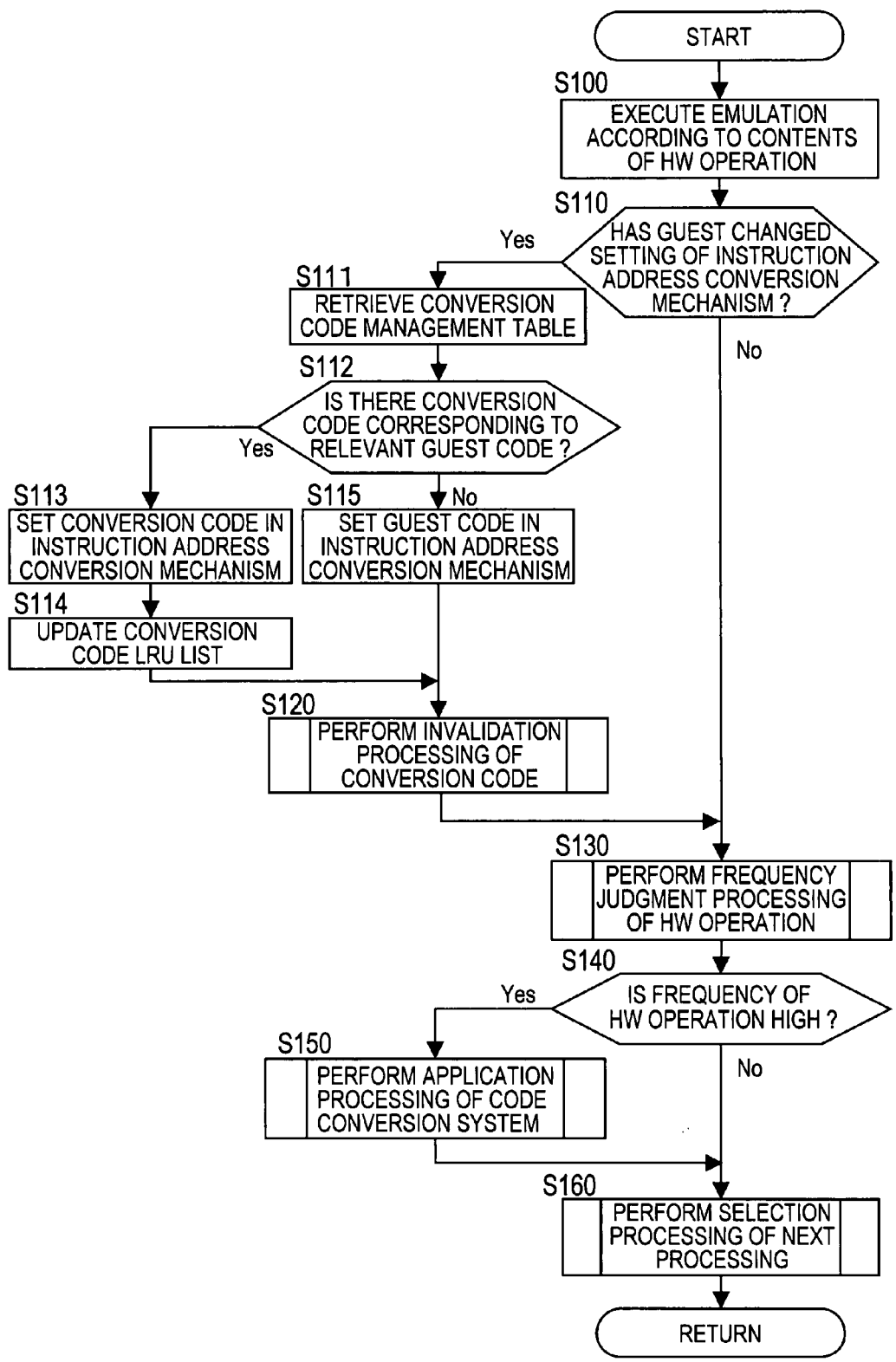
FIG. 9 is a flowchart showing the emulation processing of the VMM according to the first embodiment.

FIG. 9 is a flowchart showing the emulation processing of the VMM of Step S210 of FIG. 8.

First, the VMM 10 executes emulation according to contents of the HW operation code executed by the guest 20 (S100).

In this case, the VMM 10 judges whether contents of the emulation include a change of a guest code targeted for code conversion, i.e., whether to change setting of the instruction address conversion mechanism 93 (S110). If execution of a flush cache (FC) instruction which is a cache operation instruction has been tried by the guest 20, the VMM 10 judges that the guest code has been rewritten. If it is judged that the setting is not changed, the process proceeds to Step S130.

If it is judged that the setting is changed, the VMM 10 retrieves data in the conversion code management table 35 (S111) to judge whether there is a conversion code corresponding to the guest code (S112).

If it is judged that there is a corresponding conversion code, the VMM 10 sets correspondence between a virtual address of the guest code and a physical address of the conversion code in the instruction address conversion mechanism 93 (S113). Further, the VMM 10 adds information of the conversion code to the conversion code LRU list 36 to update the conversion code LRU list 36 (S114).

On the other hand, if it is judged that there is no corresponding conversion code, the VMM 10 sets correspondence between the virtual address of the guest code and the physical address of the guest code in the instruction address conversion mechanism 93 (S115).

Then, the VMM 10 executes invalidation processing of a conversion code corresponding to the rewritten guest code. Through the processing, the emulation system of the page of the guest code is switched to the VT system (S120).

In Step S130, the VMM 10 executes HW operation frequency judgment processing. Through the processing, whether a frequency of the HW operation executed by the guest 20 is high/low is judged.

Subsequently, the VMM 10 judges whether a frequency is high based on a result of the HW operation frequency judgment processing (S140). If it is judged that a frequency is high, the process proceeds to Step S150. If it is judged that a frequency is low, the process proceeds to Step S160.

In Step S150, the VMM 10 executes processing of applying the emulation code conversion system of the HW operation contained in the page.

In Step S160, the VMM 10 executes selection processing of next processing of the HW operation.

Figure 10:
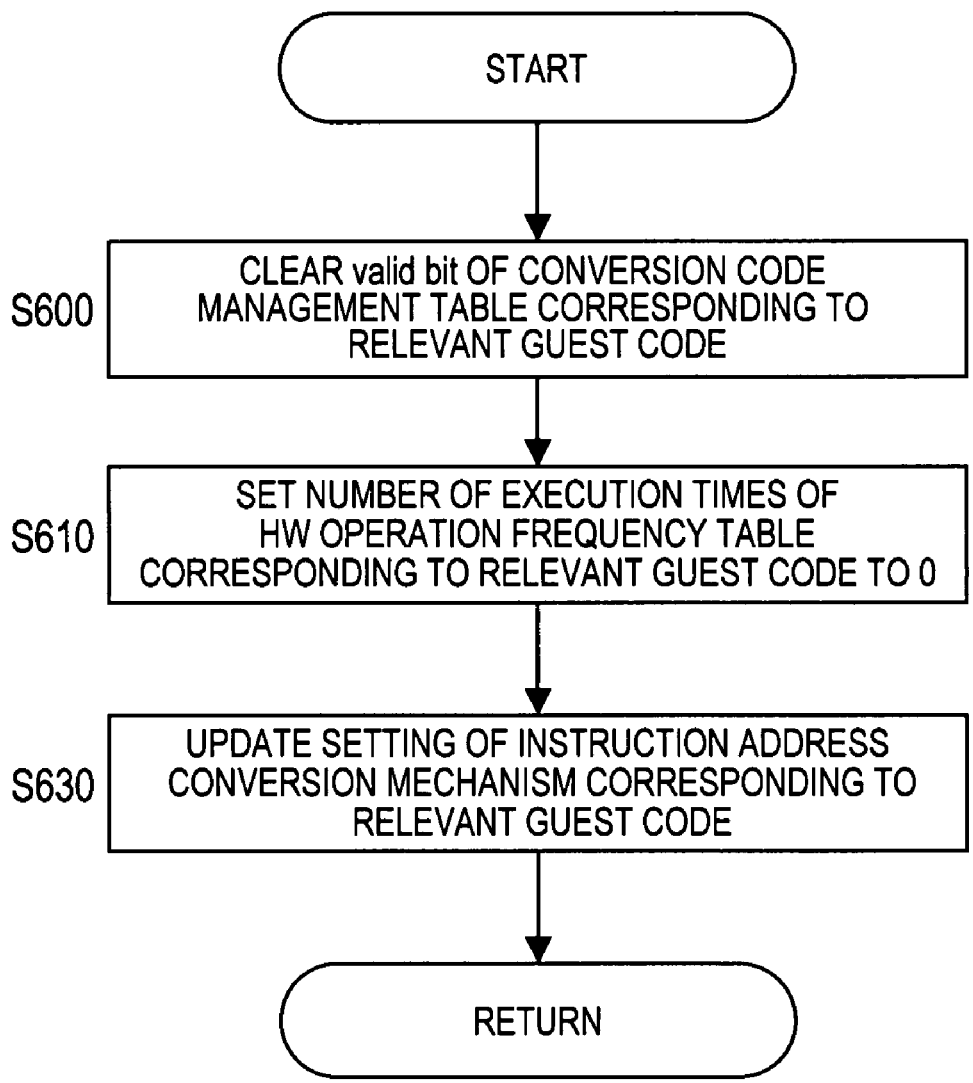
FIG. 10 is a flowchart showing the conversion code invalidation processing according to the first embodiment.

FIG. 10 is a flowchart showing the conversion code invalidation processing of Step S120 of FIG. 9.

The VMM 10 refers to the conversion code management table 35 to clear a valid bit of an entry corresponding to the rewritten guest code. In other words, the valid bit is changed to 0 (S600).

Then, the VMM 10 refers to the HW operation frequency table 72 to set the number of execution times of HW operations of the entry corresponding to the rewritten guest code to 0 (S610).

Subsequently, the VMM 10 sets correspondence between a virtual address of the rewritten guest code and a physical address of the guest code in the instruction address conversion mechanism 93 (S630).

Figure 11:
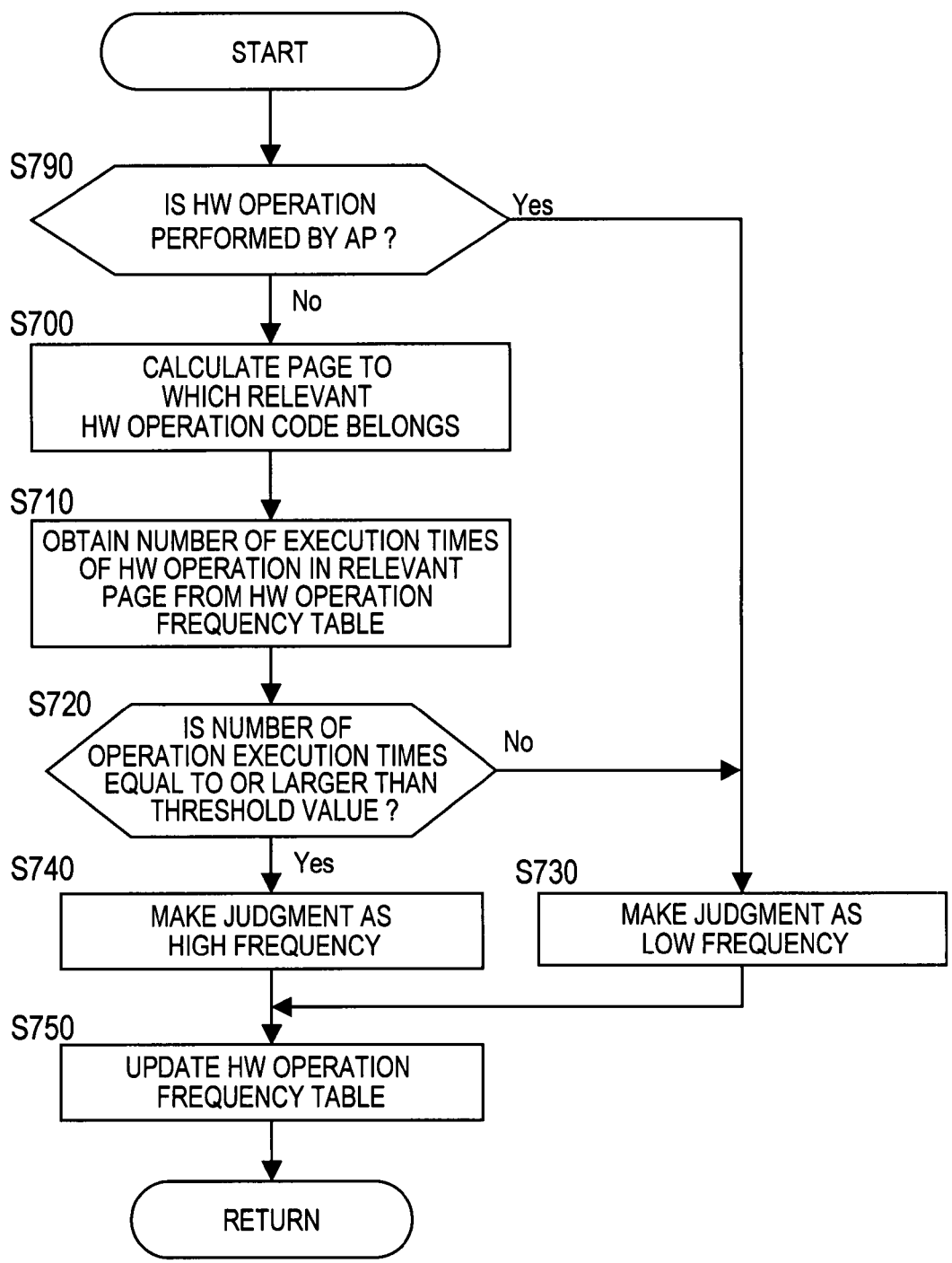
FIG. 11 is a flowchart showing the frequency judgment processing according to the first embodiment.

FIG. 11 is a flowchart showing the frequency judgment processing of Step S130 of FIG. 9.

First, the VMM 10 judges whether it is an application of the guest 20 that has executed the HW operation code (S790). If it is judged that the application has executed the HW operation code, the process proceeds to Step S730. If it is judged that the OS of the guest 20 has executed the HW operation code, the process proceeds to Step S700.

In Step S700, the VMM 10 calculates a physical address of a page to which the HW operation code belongs.

Next, the VMM 10 refers to the HW operation frequency table 72 to obtain the number of execution times of HW operations of an entry corresponding to the calculated physical address of the page (S710).

Then, the VMM 10 refers to the code conversion setting table 95 to obtain a frequency threshold value from an entry of an identification number of the guest 20 of an HW operation code request source. The obtained number of execution times of HW operations is compared with the obtained frequency threshold value to judge whether the number of execution times is equal to or larger than the threshold value (S720). If it is judged that the number of execution times is equal to or larger than the threshold value, the process proceeds to Step S740. If it is judged that the number of execution times is less than the threshold value, the process proceeds to Step S730.

In Step S740, the VMM 10 judges that a frequency of HW operations of the page is high.

In Step S730, the VMM 10 judges that a frequency of HW operations of the page is low.

Then, the VMM 10 adds 1 to the number of execution times of HW operations of the page of the HW operation frequency table 72 to update the HW operation frequency table 72 (S750).

Figure 12:
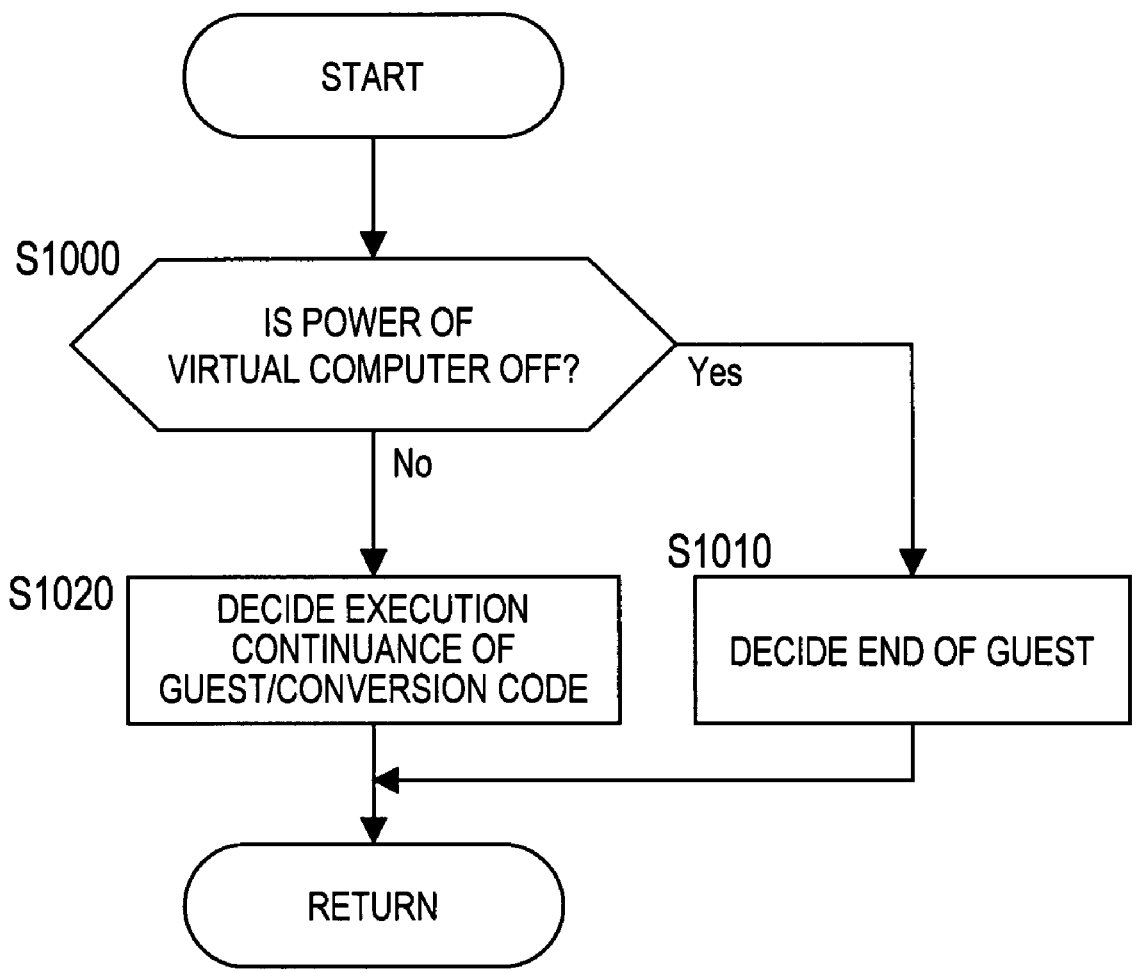
FIG. 12 is a flowchart showing the selection processing of the according to the first embodiment.

FIG. 12 is a flowchart showing the selection processing of the next processing, of Step S160 of FIG. 9.

The VMM 10 judges whether the guest 20 has been finished, i.e., whether power of the virtual computer 21 in which the guest 20 is operated has been turned off (S1000). If it is judged that the power of the virtual computer 21 has been turned off, the process proceeds to Step S1010. Otherwise, the process proceeds to Step S1020.

In Step S1010, the VMM 10 selects a guest end as processing to be executed next.

In Step S1020, the VMM 10 determines continuous application of the guest code or the conversion code to the processing to be executed next.

Figure 13:
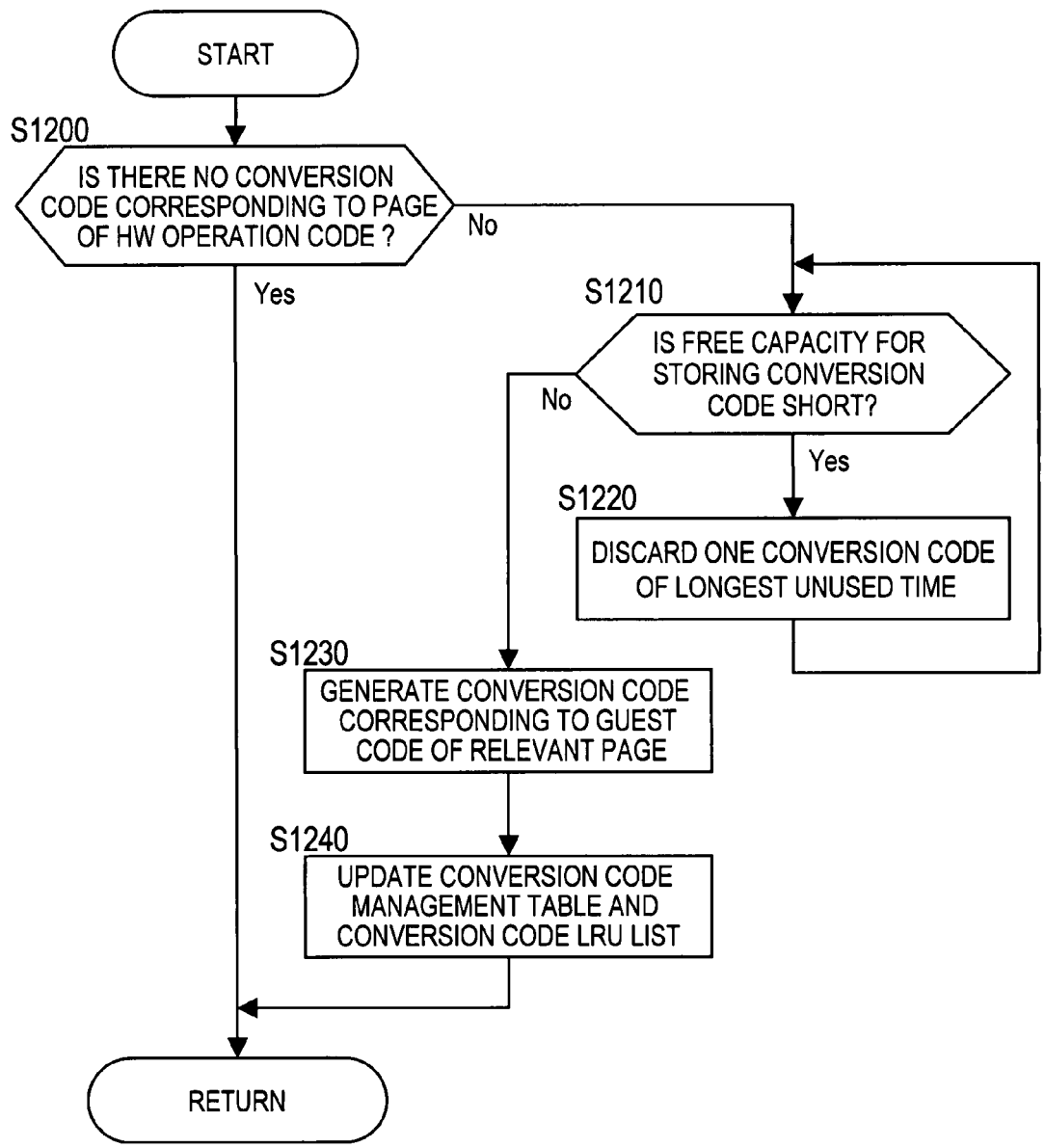
FIG. 13 is a flowchart showing the application processing of the code conversion system according to the first embodiment.

FIG. 13 is a flowchart showing the application processing of the code conversion system of Step S150 of FIG. 9.

In Step S1200, the VMM 10 refers to the conversion code management table 35 to judge whether there is a conversion code corresponding to a physical address of a page including the HW operation code. If it is judged that there is no conversion code, the process proceeds to Step S1210. If it is judged that a conversion code has been set, this process is finished to return to the flowchart of FIG. 9.

In Step S1210, the VMM 10 judges whether there is a necessary free capacity in the memory capacity of the memory area for storing the conversion code. If it is judged that there is no necessary free capacity in the memory area, the process proceeds to Step S1220. If it is judged that there is a necessary free capacity, the process proceeds to Step S1230.

In Step S1220, the VMM 10 refers to the conversion code LRU list 36 to select one of elements including a conversion code of the longest unused time. Then, by invalidating a physical address of a page belonging to the conversion code included in the selected element, the conversion code is discarded from the memory area. Further, information of the conversion code included in the selected element is deleted from the conversion code LRU list 36. Then, the process returns to Step S1210. In other words, the conversion code of the longest unused time is discarded from the memory area until a necessary free capacity is secured.

In Step S1230, the VMM 10 generates a conversion code corresponding to a guest code of the page, and stores the generated conversion code. Among conversion codes, the shadow code corresponds to the guest code one to one, and the promotion code is called in place of the HW operation code. Among the conversion codes, the promotion code includes a vms instruction, and at least one of a code for calling the emulation module 60 and the emulation code 33 which is a partial copy of the emulation module 60.

Then, the VMM 10 stores information of the generated conversion code in the conversion code management table 35. The information of the generated conversion code is added to the conversion code LRU list 36 (S1240).

Figure 14:
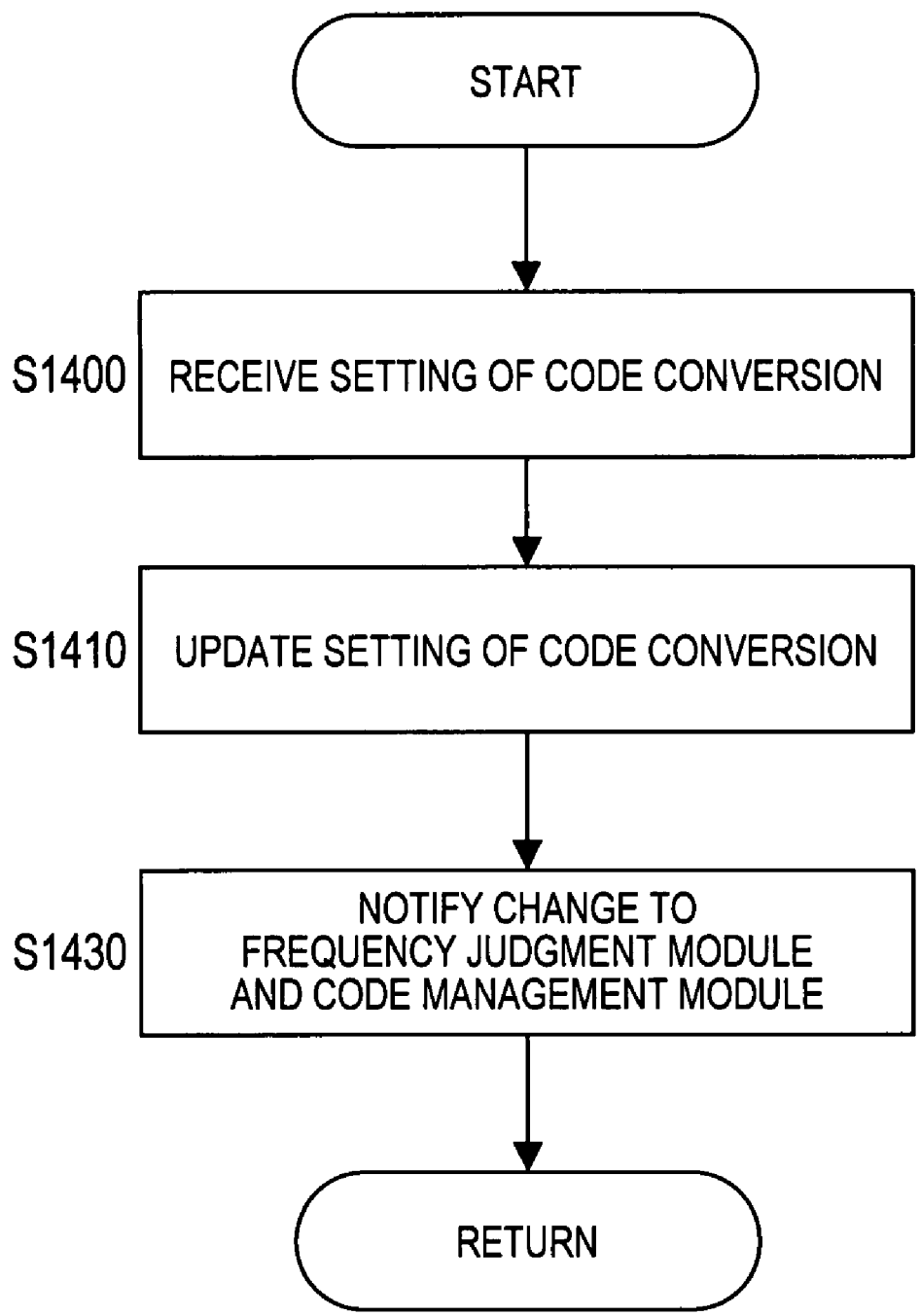
FIG. 14 is a flowchart showing the code conversion setting update processing according to the first embodiment.

FIG. 14 is a flowchart showing the code conversion setting update processing of Step S270 of FIG. 8.

First, the physical computer 90 receives a change of code conversion setting set by the system administrator from the console (S1400).

The physical computer 90 reflects contents of the received change in the code conversion setting table 95 of the storage system 91 to update the code conversion setting table 95 (S1410).

Then, the physical computer 90 notifies the updated code conversion setting table 95 to the frequency judgment module 70 and the code management module 30. Accordingly, the frequency judgment module 70 and the code management module 30 update the code conversion setting table 95 stored therein.

As described above, according to the virtual computer system of the first embodiment of this invention, when the guest 20 requests execution of the guest code including the HW operation, the VMM 10 changes the processing method according to the execution frequency of the HW operation. In other words, the HW operation is divided into two portions, and a code conversion system of high execution efficiency is applied to the portion of a high execution frequency, while the VT system of a small memory consumption amount is applied to the portion of a low execution frequency. Thus, it is possible to carry out emulation processing capable of simultaneously achieving high performance and memory saving.

Second Embodiment

A virtual computer system of a second embodiment of this invention will be described below. According to the second embodiment, a frequency of HW operations is judged based on an instruction type which is an operation type.

A hardware configuration of the second embodiment is similar to that of FIG. 1. Components similar in function to those of the first embodiment are denoted by similar reference numerals, and description thereof will be omitted.

Because of use of the instruction type for frequency judgment, the second embodiment is different from the first embodiment in two points, i.e., set contents of code conversion and a format of an HW operation frequency table.

FIG. 15 is an explanatory diagram of a code conversion setting table 95 according to the second embodiment.

Different from that of the first embodiment shown in FIG. 4, the code conversion setting table 95 stores not a threshold value but an instruction type to judge a high frequency.

The code conversion setting table 95 includes a guest identification number field 501, an upper limit field 502 of a memory amount to be used, and a list field 522 of an instruction type.

The guest identification number field 501 stores a guest identification number which is an identifier added for each guest 20. The upper limit field 520 of the memory amount to be used stores an upper limit of a memory amount to be used for holding a memory conversion code. The list field 522 of the instruction type stores an instruction type for judging a high frequency among instruction types of guest codes in a list form.

FIG. 16 is an explanatory diagram showing an HW operation frequency table 72 according to the second embodiment.

Different from that of the first embodiment shown in FIG. 5, the HW operation frequency table 72 stores an instruction type 507, and a frequency flag 508 for judging whether the instruction type is a high frequency for each guest 20.

This HW operation frequency table 72 is generated by a frequency judgment code 71 based on the setting table 95 of code conversion set by an administrator. In other words, a list of a guest identification number and an instruction type of the code conversion setting table 95 is rearranged by a guest identification number and an instruction type.

The HW operation frequency table 72 includes a guest identification number field 501, an instruction type field 507, and a frequency flag field 508.

The guest identification number field 501 stores the same guest identification number as that of the code conversion setting table 901. The instruction type field 507 stores an identifier indicating an instruction type of a guest code. The frequency flag field 508 stores a frequency flag corresponding to an instruction type. A frequency flag of 1 indicates a high frequency, and a frequency flag of 0 indicates a low frequency. An initial value of the frequency flag is obtained from the code conversion setting table 95 by a frequency judgment module 70.

Referring to a flowchart, processing of the VMM 10 executed in association with the operation of the guest 20 according to the second embodiment will be described below.

An outline of processing of the second embodiment is similar to that of the first embodiment shown in FIG. 8.

The emulation processing of the VMM of Step S210 of FIG. 8 is similar to that of FIG. 9.

Figure 17:
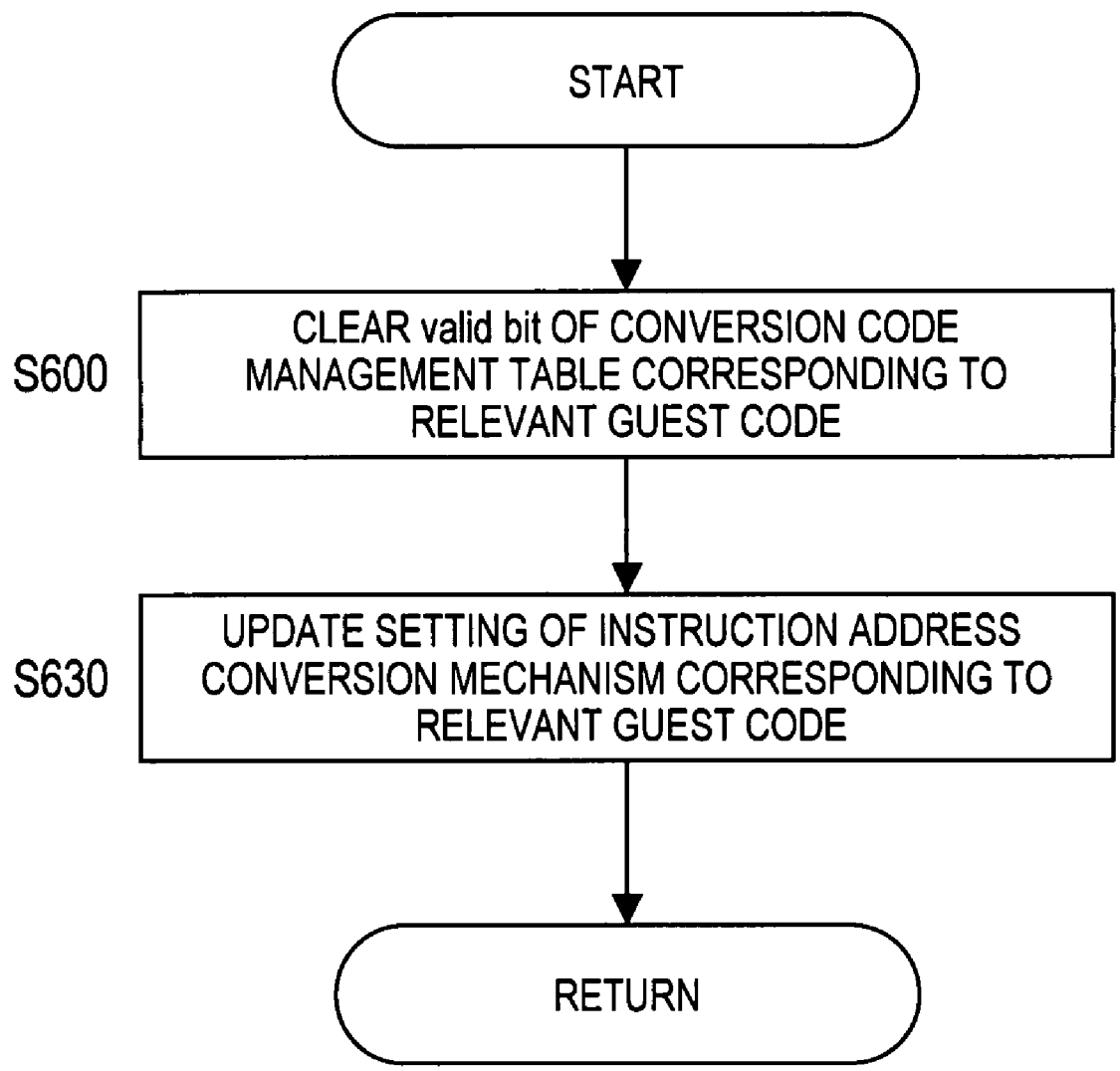
FIG. 17 is a flowchart showing conversion code invalidation processing according to the second embodiment.

FIG. 17 is a flowchart showing conversion code invalidation processing of Step S120 of FIG. 9 according to the second embodiment.

The VMM 10 refers to the conversion code management table 35 to clear a valid bit field 504 of an entry corresponding to the rewritten guest code. In other words, the valid bit is changed to 0 (S600).

Subsequently, the VMM 10 sets correspondence between a virtual address of the rewritten guest code and a physical address of the guest code in the instruction address conversion mechanism 93 (S630).

Figure 18:
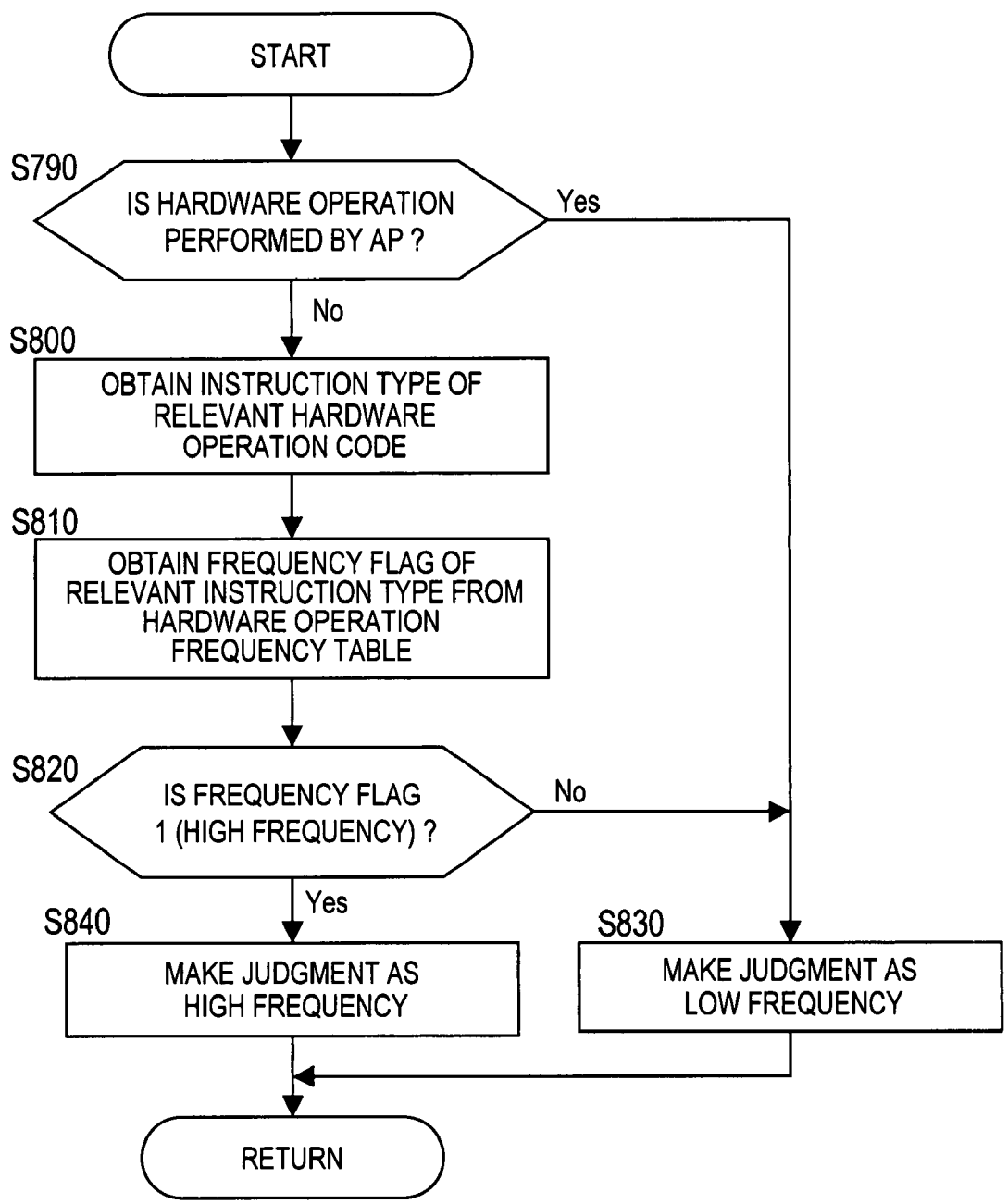
FIG. 18 is a flowchart showing the frequency judgment processing according to the second embodiment.

FIG. 18 is a flowchart showing the frequency judgment processing according to the second embodiment of Step S130 of FIG. 9.

First, the VMM 10 judges whether it is an application of the guest 20 that has executed the HW operation code (S790). If it is judged that the application has executed the HW operation code, the process proceeds to Step S830. If it is judged that the OS of the guest 20 has executed the HW operation code, the process proceeds to Step S800.

In Step S800, the VMM 10 obtains an instruction type of the HW operation code.

The VMM 10 refers to an HW operation frequency table 72 to obtain a frequency flag of an entry corresponding to the obtained instruction type (S810).

Then, the VMM 10 judges whether the obtained frequency flag is 1. If the frequency flag is 1, that is, the frequency flag indicates a high frequency, the process proceeds to Step S840. If the frequency flag is 0, that is, the frequency flag indicates a low frequency, the process proceeds to Step S830 (S820).

In Step S840, the VMM 10 judges that a frequency of HW operations of the page is high.

In Step S830, the VMM 10 judges that a frequency of HW operations of the page is low.

Selection processing of next processing of Step S160 of FIG. 9 is similar to that of the first embodiment shown in FIG. 12.

Application processing of a code conversion system of Step S150 of FIG. 9 is almost similar to that of the first embodiment shown in FIG. 13, but is different in one point described below.

First, in Step S1230, the VMM 10 eliminates an instruction whose type contained in the page is not a high frequency from a target of code conversion, and an instruction of a guest code is directly copied in a shadow code.

Code conversion setting update processing of Step S270 of FIG. 8 is similar to that of the first embodiment shown in FIG. 14.

As described above, according to the second embodiment of this invention, the guest code is classified into two portions according to an instruction type of an HW operation. Then, a code conversion system is applied to the portion which includes an instruction type of a high execution frequency, while a VT system is applied to the portion which includes no instruction type of a high execution frequency. Accordingly, it is possible to carry out emulation processing capable of simultaneously achieving high performance and memory saving.

Third Embodiment

A virtual computer system of the third embodiment of this invention will be described below. According to the third embodiment, a frequency is judged based on an interval of HW operations.

Components similar to those of the first embodiment are denoted by similar reference numerals, and description thereof will be omitted.

A hardware configuration of the third embodiment is almost similar to that of FIG. 1. However, the third embodiment is different from the first embodiment in functions of CPU's (400-1 to 400-n) to be used.

The CPU's 400 (400-1 to 400-n) are x 86 processors corresponding to VT-x functions. The CPU 400 includes an HW operation full-inhibition mode, an HW operation permission mode, and an HW operation partial-inhibition mode. The HW operation full-inhibition mode is validated by setting the CPU 400 to a VMX non-root mode. The HW operation permission mode is validated by setting the CPU 400 to a VMX root mode and a current privilege level (CPL) to 0. The HW operation partial-inhibition mode is validated by setting the CPU 400 to the VMX root mode and setting the CPL to non-0.

To shift the CPU 400 from the VMX root mode to the VMX non-root mode, a VMentry operation must be carried out. The VMentry operation is a generic term of execution of a VMLAUNCH instruction for instructing activation of a guest OS and execution of a VMRESUME instruction for temporarily stopping the guest OS. To shift the CPU 400 from the VMX non-root mode to the VMX root mode, a VMexit event must be carried out. The VMexit event is an exception event caused by execution of an HW operation.

The virtual computer system of the third embodiment will be described below.

Figure 19:
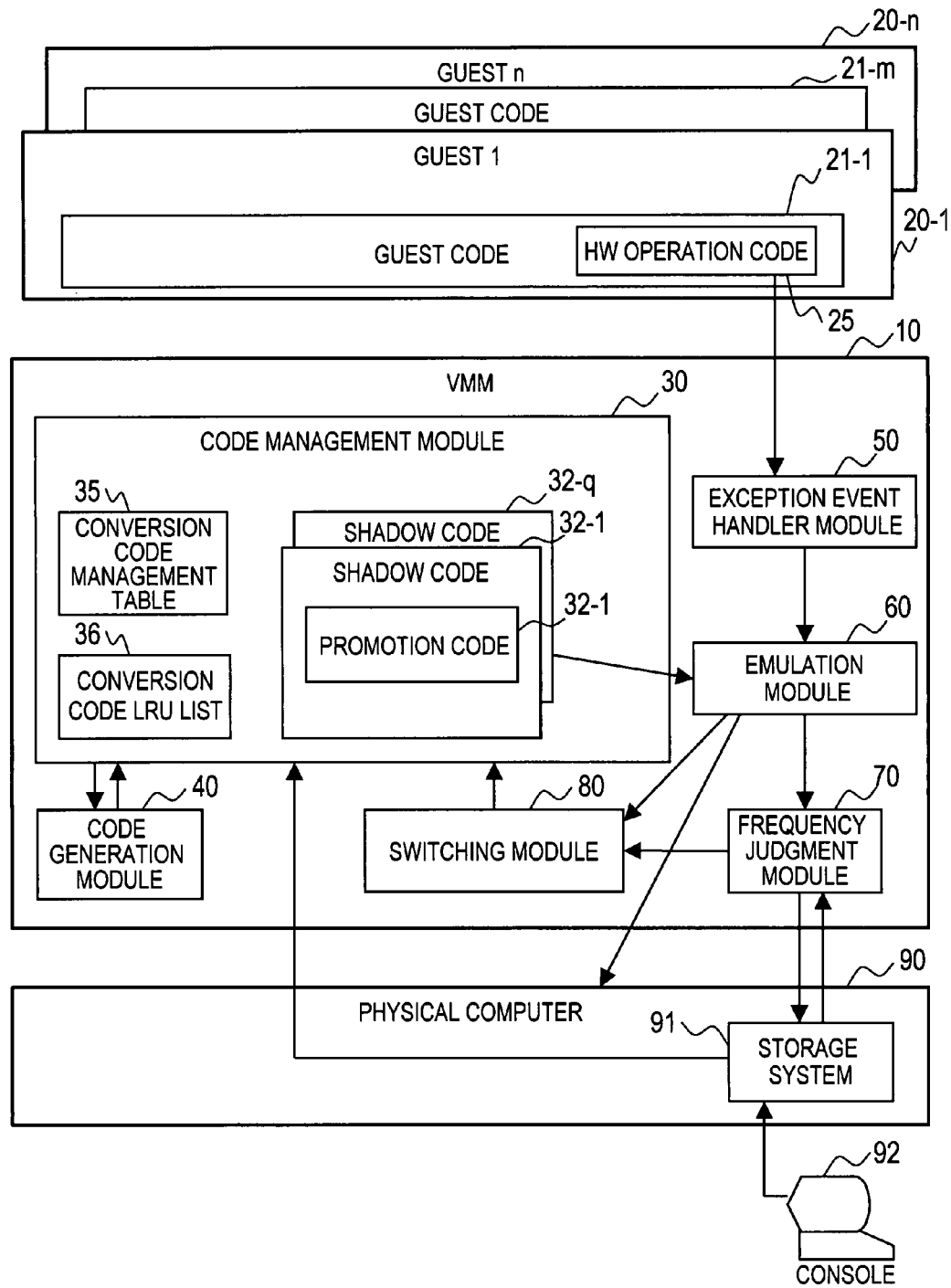
FIG. 19 is a block diagram of hardware and software including guests and the VMM according to the third embodiment.

FIG. 19 is a block diagram of hardware and software including guests 20 (20-1 to 20-n) and the VMM 10 for operating the guests 20.

FIG. 19 is almost similar to the block diagram of FIG. 2 of the first embodiment. However, an operation of a code management module 30 is different.

Processing of the VMM 10 when the guest 20 executes a guest code including an HW operation code will be described.

When the guest 20 executes a guest code 25 including an HW operation code 25, the VMM 10 generates an exception event. By this exception event, the CPU 400 shifts to the HW operation permission mode. Subsequently, an exception event handler 50 of the VMM 10 is executed.

The exception event handler module 50 analyzes an occurrence cause of the exception event, and calls the exception event, i.e., an emulation module 60 corresponding to an HW operation code.

The emulation module 60 operates a physical computer 90 when necessary. Accordingly, emulation corresponding to the HW operation code is executed. The emulation module 60 calls a frequency judgment module 70 when the emulation is executed.

The frequency judgment module 70 calculates a shortness of an HW operation interval, i.e., a frequency of HW operations, from a difference between time information when a previous HW operation is executed and time information when a current HW operation is executed. Then, by using a history of the calculated frequency, the frequency judgment muddle 70 judges a shortness of an interval between the time information when the current HW operation is executed and time information when a next HW operation is executed, i.e., a frequency. A result of the judgment is passed to a switching module 80.

The time information is information to specify time. According to this embodiment, the time information is the number of times of branch instructions between pages executed by the guest. For the time information, optional information to approximate time such as a time value of a clock included in the physical computer 90, the number of executed guest instructions, or the number of executed guest CALL or RET instructions can be used.

When necessary, such as during module initialization, the frequency judgment module 70 refers to system switching conditions stored in a storage system 91 of the physical computer 90 to store contents of the conditions therein.

The switching module 80 returns an operation mode of the CPU 400 to the HW operation full-inhibition mode if the frequency judgment module 70 judges that an interval between a current HW operation and a next HW operation is long, i.e., a low frequency. In other words, the switching module 80 executes a VMentry operation for the CPU 400. After the operation, the process is branched to a guest code.

On the other hand, if the frequency judgment module 70 judges that the interval between the current HW operation and the next HW operation is short, i.e., a high frequency, the switching module 80 first makes an inquiry about an address of a conversion code corresponding to a guest code to be executed next, to a code management module 30. Then, the operation mode of the CPU 400 is returned to the HW operation partial-inhibition mode. In other words, the switching module 80 executes a CPL increase branch instruction. After the instruction, the process is branched to a conversion code. Through the processing, the conversion code is executed in the HW operation partial-inhibition mode. For the CPL increase branch instruction, an IRET instruction, a SYSRET instruction, or a SYSEXIT instruction is used.

In response to the inquiry from the switching module 80, the code management module 30 retrieves data in a conversion code management table 35 to judge whether there is a conversion code corresponding to the inquired code. If there is a conversion code, an address of the conversion code is returned. If there is no conversion code corresponding to the inquired code, a code generation module 40 is called to generate a conversion code, and an address of the generated conversion code is returned.

The code generation module 40 refers to a next guest code page to generate corresponding shadow codes 31 (31-1 to 31-p) and a corresponding promotion code (32-1) in a memory managed by the code management module 30. Then, contents thereof are registered in the conversion code management table 35.

The shadow codes 31 (31-1 to 31-p) include the promotion code 32 (32-1) in place of an HW operation code. The promotion code 32 (32-1) shifts the CPU to the HW operation permission mode, calls the emulation module 60 to emulate an HW operation, and then returns the CPU to the HW operation partial-inhibition mode. The promotion code 32 includes a current privilege level decrease branch instruction (CPL decrease branch instruction). For the CPL decrease branch instruction, a farCALL instruction, a SYSCALL instruction, or a SYSENTER instruction is used.

A guest code 21 corresponding to the shadow code 31 may be rewritten by the guest 20. Upon detection of the rewriting, the emulation module 60 notifies the detection of the rewriting to the switching module 80. The switching module 80 invalidates a conversion code corresponding to the rewritten page to record the conversion code in the conversion code management table 35.

A code conversion setting table 95 stored in the storage system 91 is similar to that of the first embodiment of FIG. 3.

Figure 20:
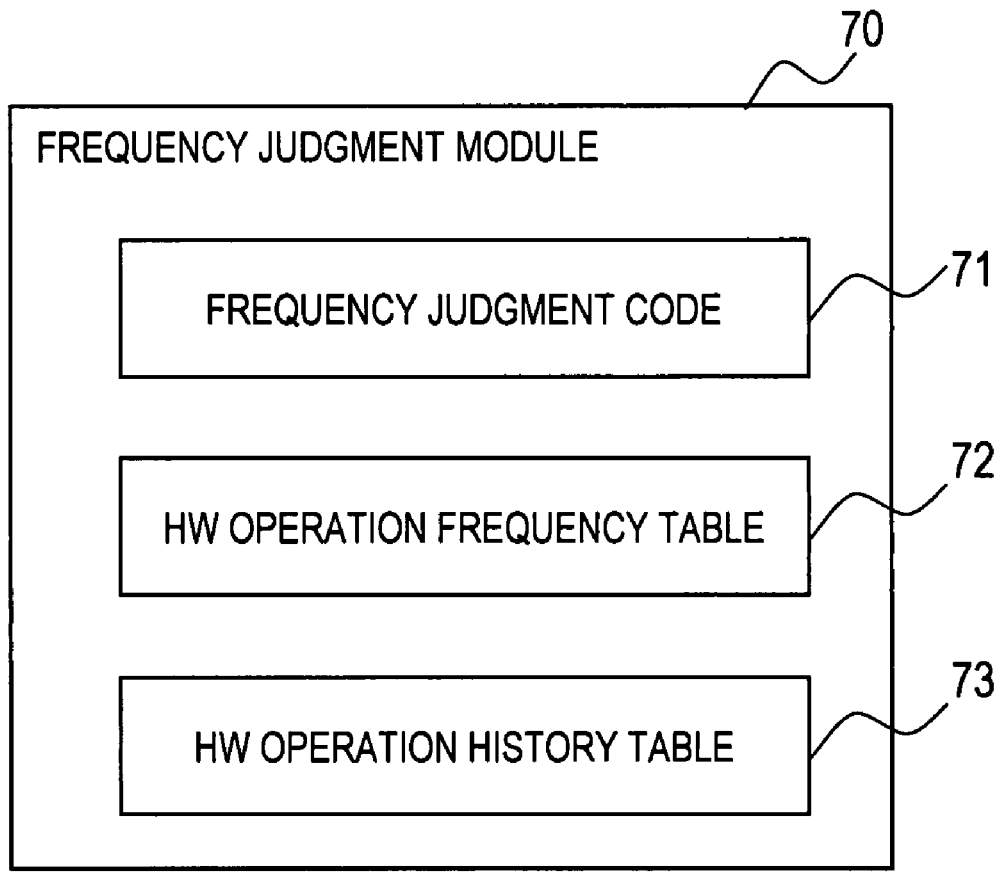
FIG. 20 is a block diagram showing a configuration of the frequency judgment module according to the third embodiment.

FIG. 20 is a block diagram showing a configuration of the frequency judgment module 70.

The frequency judgment module 70 is almost similar to the frequency judgment module 71 of the first embodiment, but the frequency judgment module 70 includes an HW operation history table 73.

When an interval between a certain HW operation X and an HW operation executed next is short, i.e., a high frequency, the HW operation frequency table 72 stores a physical address of a guest code for executing the HW operation X. The HW operation history table 73 stores an operation subject (OS or AP) which has executed a previously processed HW operation, a physical address of a guest code, and time information.

FIG. 21 is an explanatory diagram showing an example of the HW operation frequency table 72.

The HW operation frequency table 72 stores a valid bit indicating validity of the entry, and a physical address of a guest code for each guest 20.

The HW operation frequency table 72 includes a guest identification number field 501, a valid bit field 504, and a physical address field 509 of a guest code.

The guest identification number field 501 stores a guest identification number which is an identifier added for each guest 20. The valid bit field 504 stores a valid bit indicating that a physical address of the guest code is a start or middle point of a portion of a short HW operation interval, i.e., a high frequency. The guest code physical address field 509 stores a physical address of a guest code.

A physical address of a guest code which is not included in the table is a start or middle point of a portion of a long HW operation interval, i.e., a low frequency. An initial value of the valid bit is 0, i.e., invalid.

FIG. 22 is an explanatory diagram showing an example of the HW operation frequency table 73.

The HW operation history table 73 includes a guest identification number field 501, a CPU identification number field 502, an operation subject field 523, a guest code physical address field 509, and a time information field 510.

The guest identification number field 501 stores the same guest identification number as that of FIG. 21. The CPU identification number filed 502 stores a number for identifying the CPU 400. The operation subject field 523 stores an identifier for identifying whether a subject which has executed a previously processed HW operation is an OS or an AP. The guest code physical address 509 stores the same guest code physical address as that of FIG. 21. The time information field 510 stores the number of times of branch instructions between pages executed by the guest at the time point of the previously processed HW operation as described above. Optional information capable of approximating time such as a time value of a clock included in the physical computer 90, the number of executed guest instructions, or the number of executed guest CALL instructions or RET instructions can be used.

Figure 23:
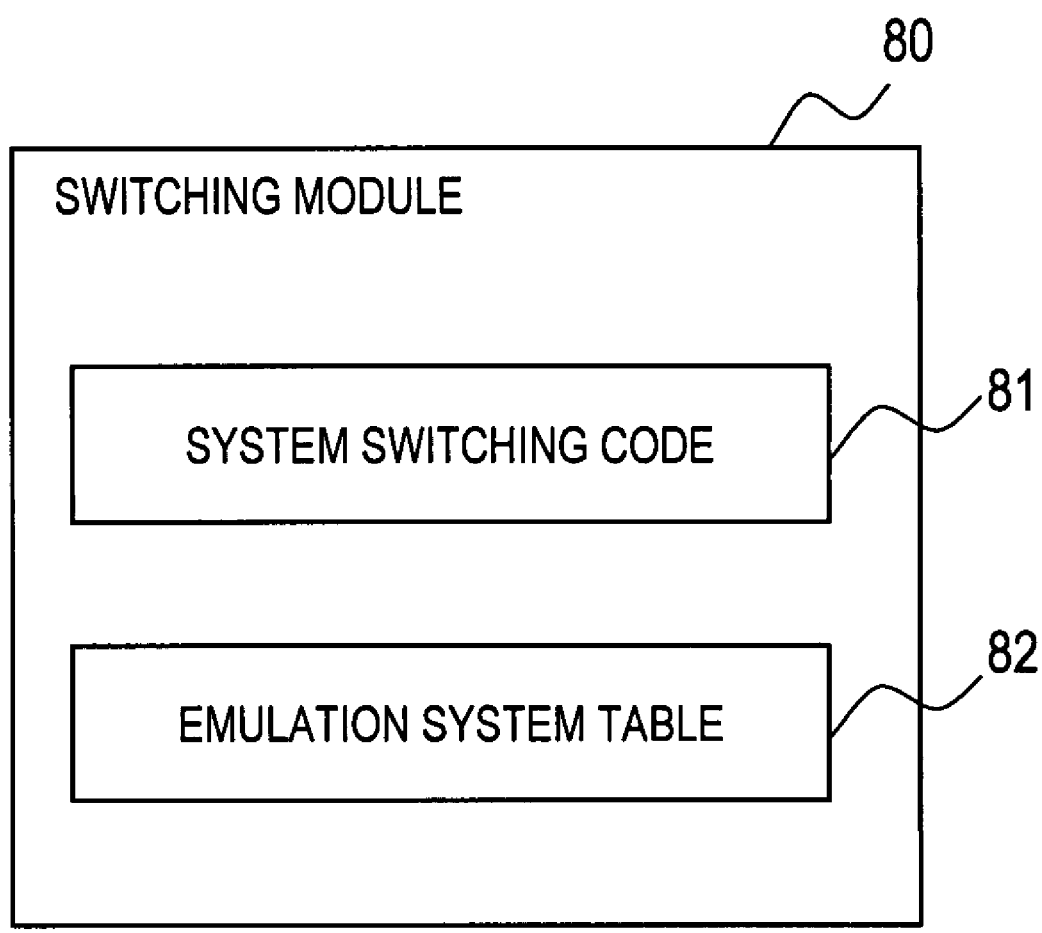
FIG. 23 is a block diagram showing a configuration of the switching module according to the third embodiment.

FIG. 23 is a block diagram showing a configuration of the switching module 80.

The switching module 80 includes a system switching code 81 and an emulation system table 82.

The emulation system is an emulation module calling system. According to this embodiment, a VT system or a code conversion system is used. The system switching code 81 switches the emulation system between the code conversion system and the VT system according to a frequency, and stores the result in the emulation system table 82. The emulation system table 82 stores a currently applied emulation system.

FIG. 24 is an explanatory diagram showing an example of the emulation system table 82.

The emulation system table 82 includes a guest identification number field 501, a CPU identification number field 502, and an emulation system field 513.

The guest identification number field 501 stores the same guest identification number as that of the HW operation frequency table 72 of FIG. 21. The CPU identification number field 502 stores the same CPU identification number as that of the HW operation history table 73 of FIG. 22. The emulation system field 513 stores a currently applied emulation system. An initial value of the emulation system is "VT SYSTEM".

FIG. 25 is an explanatory diagram showing an example of the conversion code management table 35.

The conversion code table 35 stores a physical address 509 of the guest code, and a physical address 511 of a conversion code corresponding to the guest code.

The conversion code management table 35 includes a guest identification number field 501, a guest code physical address field 509, a valid bit field 504, and a physical address 511 of the conversion code.

The guest identification number field 501 stores the same guest identification number as that of the HW operation frequency table 72 of FIG. 21. The guest code physical address 509 stores the same guest code physical address as that of FIG. 21. The valid bit field 504 stores a valid bit which is an identifier indicating whether a conversion code corresponding to the physical address is valid. An initial value of the valid bit is 0 (invalid). The conversion code physical address field 509 stores a physical address of a conversion code corresponding to the guest code physical address.

Referring to a flowchart, processing of the VMM 10 executed in association with the operation of the guest 20 according to the third embodiment will be described below.

Figure 26:
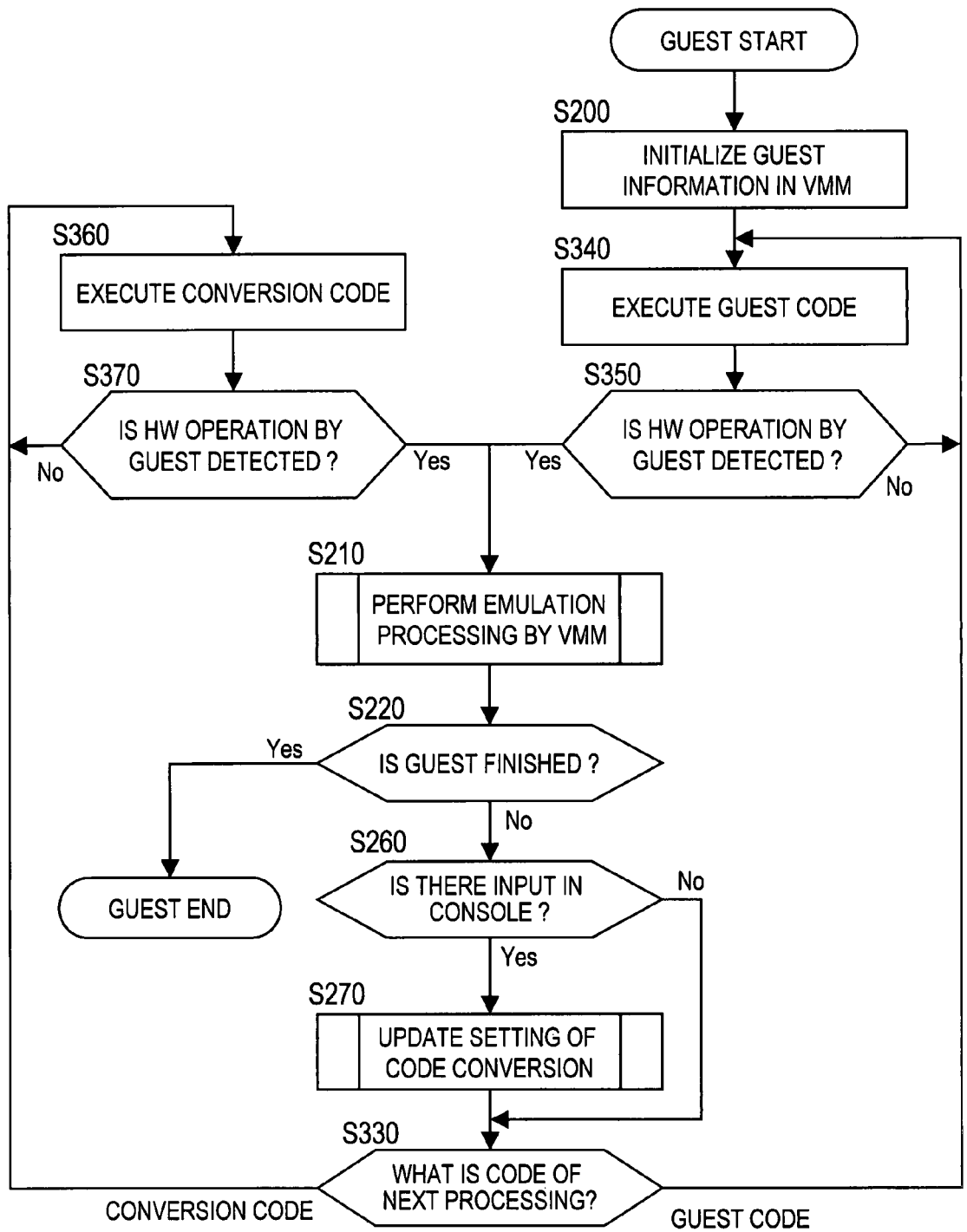
FIG. 26 is a flowchart of processing when the VMM operates the guest according to the third embodiment.

FIG. 26 is a flowchart of processing when the VMM 10 operates the guest 20.

FIG. 26 is similar to the flowchart of FIG. 8 of the first embodiment, but different in that a first HW operation is always emulated by a guest code.

First, at power-on or the like of the virtual computer to activate the guest 20, the VMM 10 refers to guest information, which the VMM 10 has, to initialize an entry regarding the activated guest (S200).

Then, the guest 20 executes a guest code in the HW operation full-inhibition mode (S340). Through execution of the guest code by the guest 20, the VMM 10 judges whether execution of an HW operation code has been detected (S350).

Upon detection of the execution of the HW operation by the guest 20, the VMM 10 generates an exception event to shift an operation mode of the CPU 400 to the HW operation permission mode. Subsequently, the process proceeds to Step S210. On the other hand, if the VMM 10 does not detect the execution of the HW operation, the process returns to Step S340 to execute a next guest code.

In Step S210, the VMM 10 executes emulation processing of an HW operation. Through the emulation processing, a type of a code to be executed next is determined.

Next, the VMM 10 judges whether the guest 20 has been finished by power cutting-off or the like of the virtual computer. If the end of the guest 20 is judged, the VMM 10 finishes the processing of the guest 20. On the other hand, if it is judged that the guest 20 has not been finished but the operation continues, the process proceeds to Step S260.

In Step S260, the VMM 10 judges whether a setting change of code conversion by the system administrator has been input to the console 92. If it is judged based on the input to the console 92 that the setting 95 of the code conversion has been changed, the process proceeds to Step S270. On the other hand, if the setting 95 of the code conversion has not been changed, the process proceeds to Step S330.

In Step S270, the physical computer 90 receives contents set by the console 92 to execute setting update processing of the code conversion for updating the setting 95 of the code conversion of the storage system 91.

Then, the VMM 10 judges whether processing to be executed next by the guest 20 is execution of a conversion code (S330). If the next processing is judged to be execution of a conversion code, the VMM 10 executes a CPL increase branch instruction to shift the CPU operation mode to the HW operation partial-inhibition mode. Subsequently, the process proceeds to Step S360. On the other hand, if the next processing is judged to be execution of a guest code, the VMM 10 executes a VMentry operation to shift the CPU operation mode to the HW operation full-inhibition mode. Then, the process returns to Step S340.

In Step S360, the VMM 10 executes the conversion code in the HW operation partial-inhibition mode.

Then, the VMM 10 detects execution of a promotion code by the guest 20 to judge whether the emulation module 60 has been called (S370). If the promotion code has been executed to call the emulation module, the VMM 10 shifts the CPU operation mode to the HW operation permission mode, and proceeds to Step S210. On the other hand, if the VMM 10 does not detect the execution of the promotion code, the process returns to Step S360 to execute a next conversion code.

Figure 27:
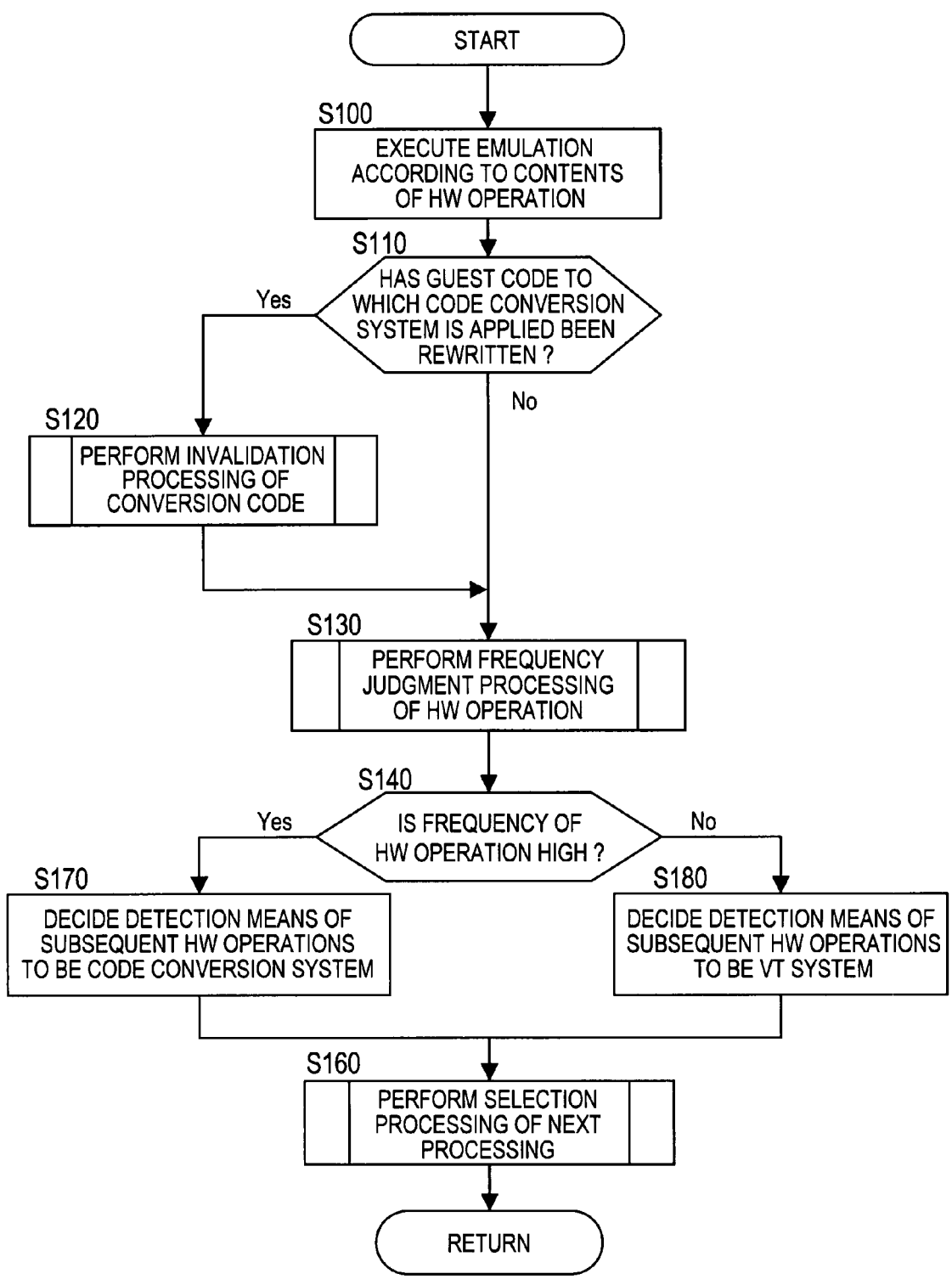
FIG. 27 is a flowchart showing the emulation processing of the VMM according to the third embodiment.

FIG. 27 is a flowchart showing the emulation processing of the VMM of Step S210 of FIG. 26.

First, the VMM 10 executes emulation according to contents of the HW operation code executed by the guest 20 (S100).

In this case, the VMM 10 judges whether contents of the emulation contain changing of a guest code of a code conversion target (S110). If the guest 20 has executed writing in a write-protect page, the VMM 10 judges whether there is a guest code in the page to determine changing/unchanging of the guest code. If unchanging is determined, the process proceeds to Step S130. On the other hand, if changing is determined, the process proceeds to Step S120.

In Step S120, the VMM 10 executes invalidation processing of a conversion code corresponding to the rewritten guest code (S120).

In Step S130, the VMM 10 executes HW operation frequency judgment processing. Through the processing, whether a frequency of the HW operation executed by the guest 20 is high/low is judged.

Subsequently, the VMM 10 judges whether a frequency is high based on a result of the HW operation frequency judgment processing (S140). If it is judged that a frequency is high, the process proceeds to Step S170. If it is judged that a frequency is low, the process proceeds to Step S180.

In Step S170, the VMM 10 determines detection means of HW operations thereafter to be a code conversion system. Then, a emulation system 513 corresponding to the guest and the CPU of the emulation system table 82 is changed to the code conversion system.

On the other hand, in Step S180, the VMM 10 determines detection means of HW operations thereafter to be a VT system. Then, the emulation system 513 corresponding to the guest and the CPU of the emulation system table 82 is changed to the VT system.

The VMM 10 executes selection processing of next processing of the HW operation in Step S160.

Figure 28:
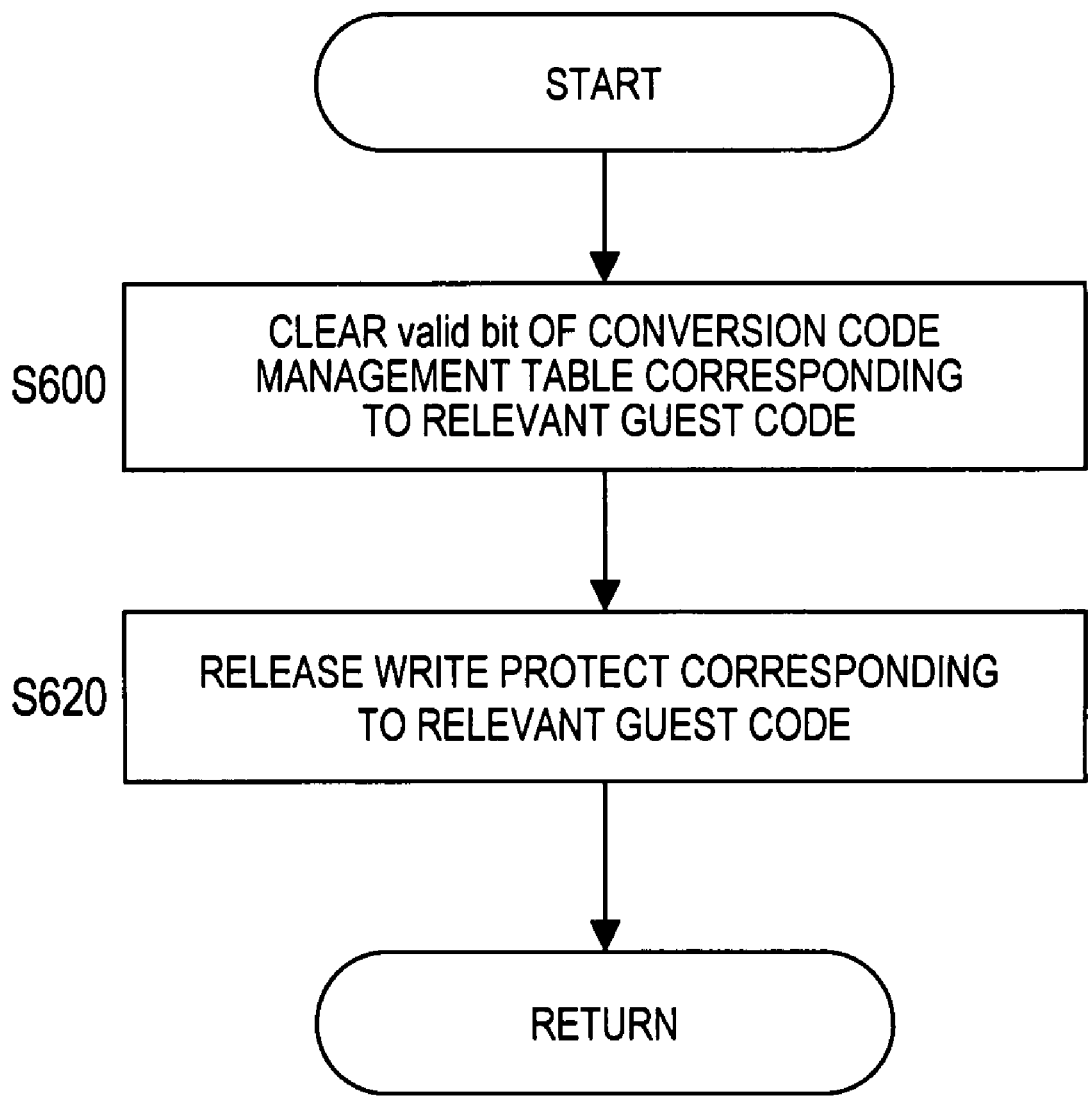
FIG. 28 is a flowchart showing the conversion code invalidation processing according to the third embodiment.

FIG. 28 is a flowchart showing the conversion code invalidation processing of Step S120 of FIG. 27.

The VMM 10 refers to the conversion code management table 35 to clear a valid bit of an entry corresponding to the rewritten guest code. In other words, the valid bit is changed to 0 (S600).

Then, the VMM 10 releases the write-protect corresponding to the rewritten guest code (S620).

Figure 29:
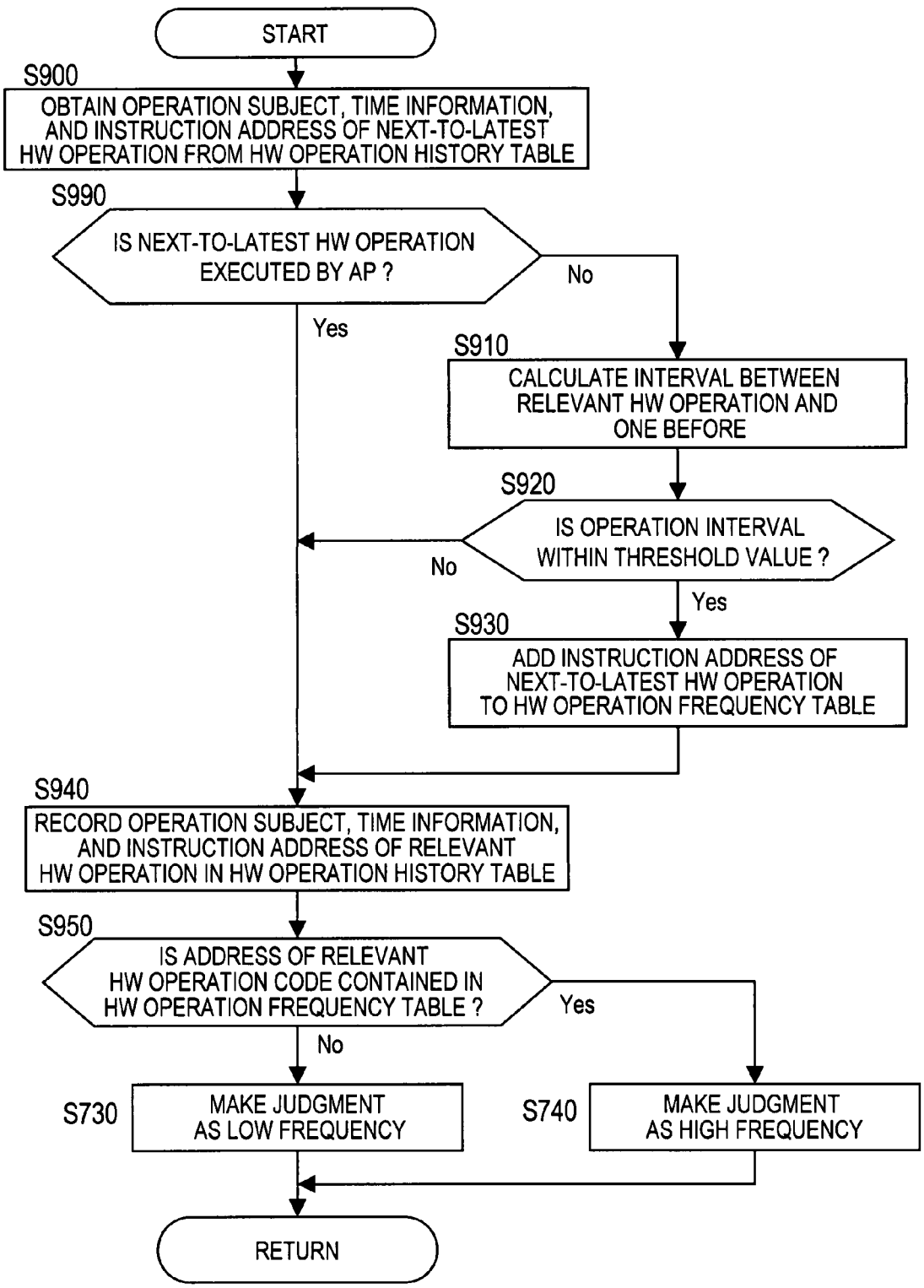
FIG. 29 is a flowchart showing the frequency judgment processing according to the third embodiment.

FIG. 29 is a flowchart showing the frequency judgment processing of Step S130 of FIG. 27.

First, the VMM 10 refers to the HW operation history table 73 to obtain an entry regarding a previously executed HW operation. An operation subject, a physical address of a guest code, and time information of the entry are obtained (S900).

Then, the VMM 10 judges whether the operation subject of the previously executed HW operation is an application (AP)

(S990). If the operation subject is judged to an AP, the process proceeds to Step S940. If the operation subject is judged not to be an AP, in other words, if the operation subject is judged to be an OS, the process proceeds to Step S910.

In Step S910, the VMM 10 calculates an interval of HW operations from a difference between time information of a current HW operation and time information of the previous HW operation.

Subsequently, the VMM 10 compares the calculated interval of HW operations with a threshold value obtained from the code conversion setting table 95. Based on a result of the comparison, judgment is made as to whether the calculated interval of HW operation is within a range of the obtained threshold value (S920). If the calculated interval of HW operations is judged to be within the threshold value, the process proceeds to Step S930. On the other hand, if the calculated interval of HW operations is judged to exceed the threshold value, the process proceeds to Step S940.

In Step S930, the VMM 10 adds the physical address of the guest code of the entry regarding the previous HW operation to the HW operation frequency table 72. Then, a valid bit of the added entry is set to 1. Accordingly, the physical address of the guest code is set as a start or middle point of a high-frequency portion.

In Step S940, the VMM 10 stores an entry regarding a currently executed HW operation, i.e., an operation subject, an instruction address of a guest code, and time information in the HW operation history table 73.

Then, regarding the currently executed HW operation, the VMM 10 judges whether the instruction address of the guest code of the HW operation is included in the HW operation frequency table 72 (S950). If the instruction address is judged to be included in the HW operation frequency table 72, the process proceeds to Step S740. If the instruction address is judged not to be included in the HW operation table 72, the process proceeds to Step S730.

In Step S740, the VMM 10 judges that the currently executed HW operation is a start or middle point of a high-frequency portion.

In Step S730, the VMM 10 judges that the currently executed HW operation is a start or middle point of a low-frequency portion.

Figure 30:
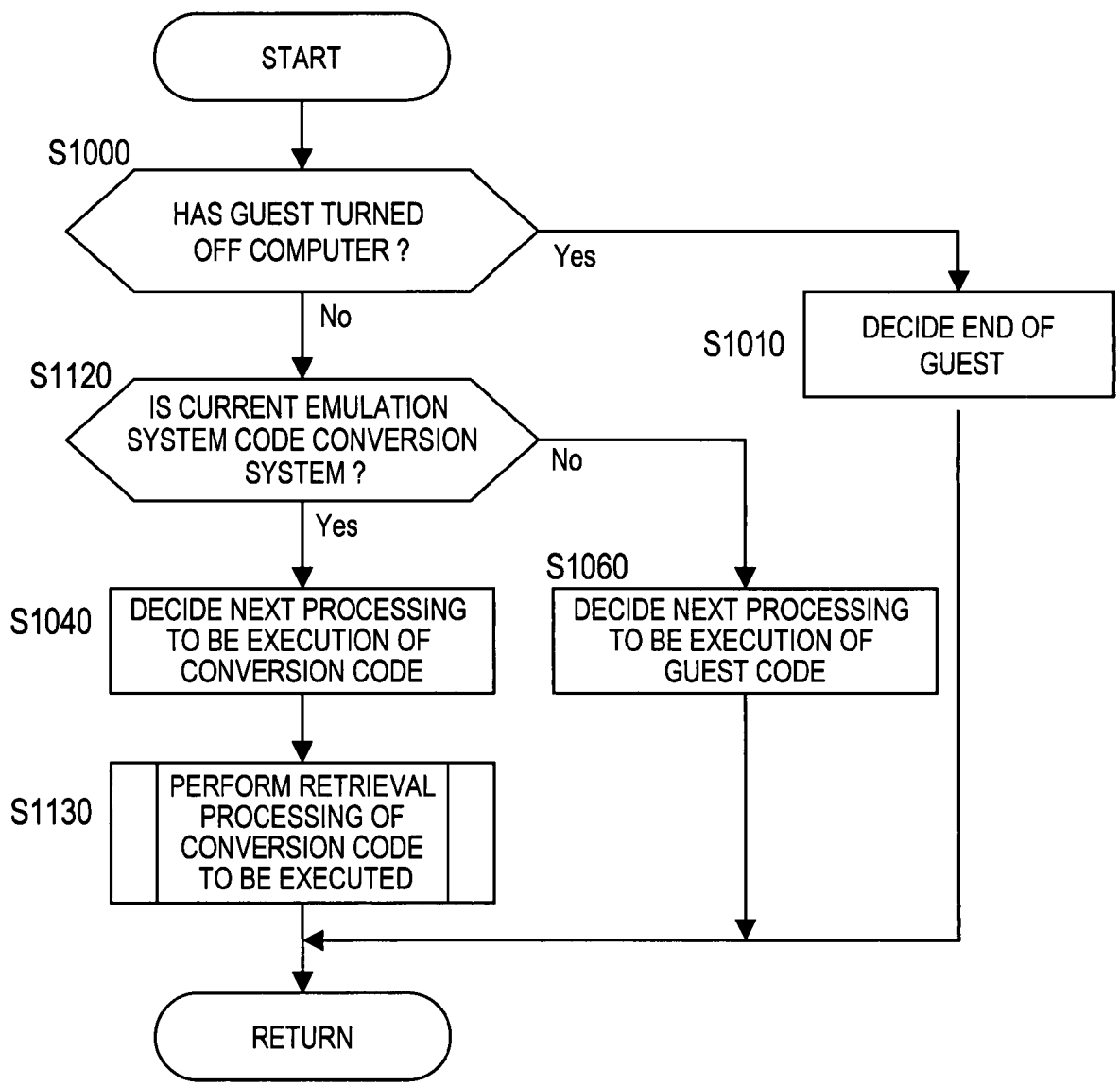
FIG. 30 is a flowchart showing the selection processing according to the third embodiment.

FIG. 30 is a flowchart showing the selection processing of the next processing of Step S160 of FIG. 27.

The VMM 10 judges whether the guest 20 has been finished, i.e., whether power of the virtual computer 21 in which the guest 20 is operated has been turned off (S1000). If it is judged that the power of the virtual computer 21 has been turned off, the process proceeds to Step S1010. Otherwise, the process proceeds to Step S1120.

In Step S1010, the VMM 10 selects a guest end as processing to be executed next.

In Step S1120, the VMM 10 refers to the emulation system table 82 to judge whether a current emulation system is a code conversion system. If the current emulation system is judged to be a code conversion system, the process proceeds to Step S1040. If the current emulation system is judged to be a VT system, the process proceeds to Step S1060.

In Step S1040, the VMM 10 determines to apply a conversion code to processing to be executed next. Then, conversion code retrieval processing for retrieving a conversion code to be executed next is executed (S1130).

On the other hand, in Step S1060, application of a guest code to processing to be executed next is determined.

Figure 31:
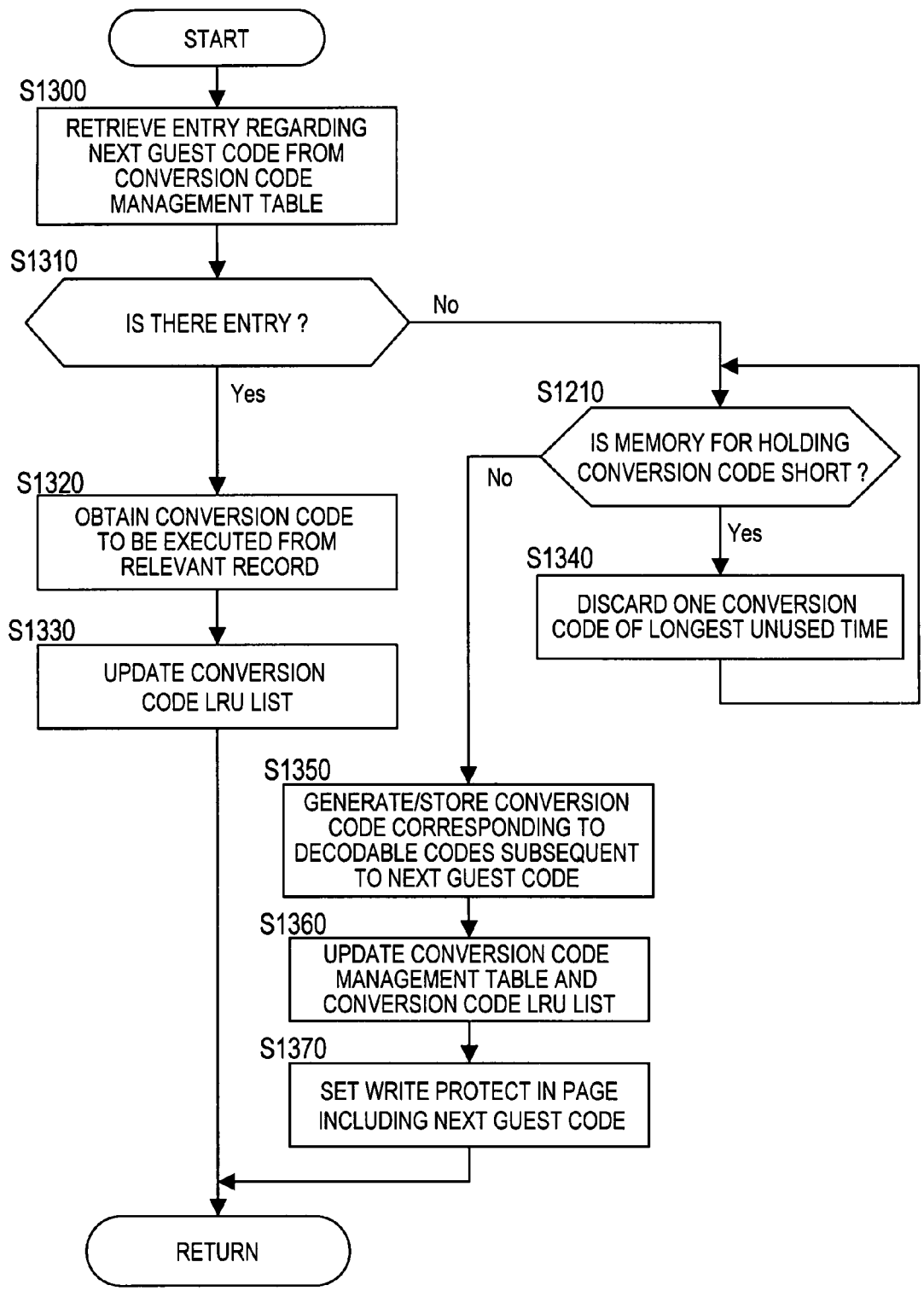
FIG. 31 is a flowchart showing the conversion code retrieval processing according to the third embodiment.

FIG. 31 is a flowchart showing the conversion code retrieval processing of Step S1130 of FIG. 30.

First, the VMM 10 refers to the conversion code management table 35 to retrieve an entry corresponding to a next guest code of a currently processed HW operation code (S1300).

Then, the VMM 10 judges whether there is the entry (S1310). If it is judged that there is an entry, the process proceeds to Step S1320. If it is judged that there is no entry, the process proceeds to Step S1210.

In Step S1210, the VMM 10 judges whether there is a necessary free capacity in the memory capacity of the memory area for storing the conversion code. If it is judged that there is no necessary free capacity in the memory area, the process proceeds to Step S1340. If it is judged that there is a necessary free capacity, the process proceeds to Step S1350.

In Step S1340, the VMM 10 refers to the conversion code LRU list 36 to select one of elements including a conversion code of the longest unused time. Then, by invalidating a physical address of a page belonging to the conversion code included in the selected element, the conversion code is discarded from the memory area. Further, information of the conversion code included in the selected element is deleted from the conversion code LRU list 36. Then, the process returns to Step S1210. In other words, the conversion code of the longest unused time is discarded from the memory area until a necessary free capacity is secured.

On the other hand, in Step S1350, the VMM 10 generates a conversion code corresponding to a decodable code among codes after a guest code to be executed next, and stores the generated code. The conversion code includes a shadow code and a promotion code. The shadow code is generated corresponding to the guest code. The shadow code contains a promotion code in place of an HW operation code included in the guest code. The promotion code contains a CPL decrease branch instruction for calling an emulation module. The conversion code generated in this step is used as a result of the retrieval.

Then, the VMM 10 stores information of the generated conversion code in the conversion code management table 35. Further, the information of the generated conversion code is added to a tail end of the conversion code LRU list 36 (S1360).

Then, the VMM 10 sets a write-protect in a page including the guest code to detect rewriting of the guest code (S1370).

On the other hand, in Step S1320, the VMM 10 obtains an address of a conversion code to be executed next from the retrieved entry. The obtained conversion code is used as a result of the retrieval.

The VMM 10 changes a set of conversion codes corresponding to the entry to the newest one to update the conversion code LRU list 36 (S1330).

Code conversion setting update processing of Step S270 of FIG. 26 is similar to that of the flowchart of FIG. 14 of the first embodiment.

As described above, according to the virtual computer system of the third embodiment of this invention, when execution of the guest code including the HW operation is requested by the guest 20, the VMM 10 changes a processing method according to an execution interval of the HW operations. In other words, the HW operation is divided into two portions. The code conversion system of high execution efficiency is applied to the portion of a small execution interval (i.e., execution frequency is high), while the VT system of a small memory consumption amount is applied to a portion of a large execution interval (i.e., execution frequency is low). Thus, it is possible to carry out emulation processing capable of simultaneously achieving high performance and memory saving.

This invention can be applied to a virtual computer system equipped with IPF having a VT-i function or x86 having a VT-x function.

While the present invention has been described in detail and pictorially in the accompanying drawings, the present invention is not limited to such detail but covers various obvious modifications and equivalent arrangements, which fall within the purview of the appended claims.

What is claimed is:

1. A server system, comprising:
   at least one CPU;
   a memory for storing data and a program; and
   an interface for exchanging data with the outside, wherein:
   the CPU executes the program stored in the memory to execute a virtual machine monitor for operating at least one virtual computer in which an operating system operates; and
   the virtual machine monitor includes:
      an emulation module for emulating an operation based on an operation code for executing the operation of hardware of the server system when the operation of the hardware of the server system is requested by one of the operating system and an application operated in the operating system;
      an exception event handler module for calling the emulation module when an exception event is generated by the CPU through detection of the operation of the hardware of the server system;
      a code management module for managing a promotion code used for emulating the operation of the hardware of the server system by switching an operation mode of the CPU to call the emulation module;
      a frequency judgment module for judging whether a frequency of the operation of the hardware of the server system higher than a predetermined threshold value based on a result of comparison with predetermined judgment conditions; and
      a switching module for determining whether to call the emulation module by one of the exception event handler module and by executing the promotion code based on the judged frequency,
   wherein the CPU includes two operation modes of a hardware operation permission mode and a hardware operation inhibition mode, and generates an exception event to switch the operation mode to the hardware operation permission mode when the operation of the hardware is detected while the operation mode is the hardware operation inhibition mode;
   the promotion code contains an instruction of switching between the hardware operation permission mode and the hardware operation inhibition mode;
   the virtual machine monitor includes a generation module for generating a shadow code to emulate the operation of the hardware of the server system, which corresponds to the operation code by calling the promotion code when the operation mode of the CPU is the hardware operation inhibition mode;
   when the operation is requested while the operation mode of the CPU is the hardware operation inhibition mode, the switching module executes the promotion code by calling the shadow code if a frequency of the operation of the hardware of the server system is higher than a predetermined threshold value, and calls the emulation module by the promotion code,
   the CPU is shifted to the hardware operation permission mode by setting a current privilege level to 0 and setting a VMX root mode, and shifted to the hardware operation inhibition mode by one of setting the current privilege level to a value other than 0 and setting a VMX non-root mode;
   the promotion code contains an instruction of changing the current privilege level; and
   the switching module is configured to:
      correlate an address of the operation code for executing the operation of the hardware of the server system with a storage address of the shadow code; and
      execute the shadow code by executing processing branching to the storage address of the shadow code in place of processing branching to the operation code based on the correlation when emulation of the operation is executed to call the emulation module by executing the shadow code.

2. The server system according to claim 1, wherein when a frequency of a first operation of the hardware of the server system requested by one of the operating system and the application operated in the operating system satisfies predetermined conditions, the switching module calls the emulation module by executing the promotion code rather than the exception event handler module calling the emulation module in a case of executing a second operation code near a first operation code on an instruction address space, for executing the first operation.

3. The server system according to claim 1, wherein:
   when the virtual machine monitor detects that the operation code to execute the operation has been changed by one of the operating system and the application operated in the operating system, the switching module invalidates a shadow code corresponding to the changed operation code; and
   the switching module calls the emulation module by the exception event handler module rather than executing the shadow code to call the emulation module in a case of executing the changed operation code.

4. The server system according to claim 1, wherein when a memory capacity has no free area to hold new shadow code or new promotion code, the switching module selects a shadow code having a longest unexecuted period among the generated shadow codes, deletes the selected shadow code and a promotion code associated with the selected shadow code from the memory, and calls the emulation module by the exception event handler module rather than executing the deleted shadow code.

5. The server system according to claim 1, wherein the frequency judgment module is configured to:
   hold frequency information with which specifying of the operation of a high frequency becomes possible;
   judge whether a type of the requested operation is contained in the held frequency information when the operation is requested; and
   judge that a frequency of the requested operation is higher than the predetermined threshold value when the type of the requested operation is contained in the held frequency information.

6. The server system according to claim 1, wherein the frequency judgment module is configured to:
   hold a number of execution times of an operation code belonging to each of predetermined address ranges in an instruction address space of the operation code for each of the predetermined address ranges; and
   obtain the number of execution times of all operation codes included in each of the address ranges to which the operation code for executing the requested operation belongs when the operation is requested to judge that a frequency of the requested operation is higher than the predetermined threshold value when the obtained number of execution times exceeds a predetermined threshold value.

7. The sever system according to claim 1, wherein the frequency judgment module is configured to:
hold time information with which specifying of execution time of the operation becomes possible;
calculate an interval between time information of execution time of the operation code for executing the requested operation and time information of previous execution time of the operation code for executing the requested operation; and
judge that a frequency of the operation higher than the predetermined threshold value when the calculated interval is smaller than a predetermined threshold value.

8. The server system according to claim 1, further comprising:
an input unit for receiving the predetermined judgment conditions entered by an administrator; and
a storage system for storing the received predetermined judgment conditions.

9. The server system according to claim 1, wherein:
the shadow code is operated in a state where the current privilege level is set to 3 and the VMX root mode is set.

10. The server system according to claim 1, wherein:
the generation module inserts an emulation code contained in the emulation module in the promotion code; and
the operation of the hardware of the server system is executed through execution of the emulation code in addition to the promotion code.

11. The server system according to claim 1, wherein:
the generation module inserts the promotion code in the shadow code; and
the operation of the hardware of the server system is emulated in the virtual machine monitor through execution of the promotion code in addition to the shadow code.

12. A data storage medium which stores a control program for a virtual computer which, when executed by a server system equipped with at least one CPU, a memory for storing data and a program, and an interface for exchanging data with the outside, causes the server system to operate at least one virtual computer in which an operating system operates, to perform a method comprising:
a first step of emulating an operation of hardware based on an operation code for executing the operation of the hardware of the server system when an exception event is generated by the CPU through detection of the operation of the hardware of the server system in receiving a request of the operation of the hardware of the server system by one of the operating system and an application operated in the operating system;
a second step of executing a promotion code to emulate the operation of the hardware of the server system by switching an operation mode of the CPU;
a third step of judging whether a frequency of the operation is higher than a predetermined threshold value based on a result of comparison with predetermined judgment conditions; and
a fourth step of determining which of the first step and the second step is to be executed based on the judged frequency,
wherein the CPU includes two operation modes of a hardware operation permission mode and a hardware operation inhibition mode, and generates an exception event to switch the operation mode to the hardware operation permission mode when the operation of the hardware is detected while the operation mode is the hardware operation inhibition mode;
the first step includes a step of switching the operation mode of the CPU to the hardware operation permission mode to emulate the operation when the exception event is generated by the CPU through detection of the operation in receiving the request of the operation while the operation mode of the CPU is the hardware operation inhibition mode;
the second step includes a step of generating a shadow code to emulate the operation of the hardware of the server system, which corresponds to the operation code by calling the promotion code when the operation mode of the CPU is the hardware operation inhibition mode; and
the fourth step includes a step of executing the second step if a frequency of the operation of the hardware of the server system is higher than a predetermined threshold value when the operation is requested while the operation mode of the CPU is the hardware operation inhibition mode, and
wherein the first step includes a step of shifting the CPU to the hardware operation permission mode by generating a VMexit event to set the CPU to a VMX root mode;
the second step includes a step of shifting the CPU to the hardware operation permission mode by executing a current privilege level decrease branch instruction to set a current privilege level of the CPU to 0; and
the fourth step includes the steps of:
executing the second step in place of the first step in a case of executing emulation of the operation by executing processing branching to a storage virtual address of the shadow code in place of processing branching to an instruction address of the operation code for executing the operation of the hardware of the server system; and
executing the first step in place of the second step in a case of executing emulation of the operation by executing the processing branching to the instruction address of the operation code for executing the operation of the hardware of the server system.

13. The data storage medium according to claim 12, wherein when a frequency of a first operation of the hardware of the server system requested by one of the operating system and the application operated in the operating system satisfies predetermined conditions, the fourth step executes the second step in place of the first step in a case of executing a second operation code near a first operation code on an instruction address space, for executing the first operation.

14. The data storage medium according to claim 12, further comprising the steps of:
detecting that the operation code to execute the operation has been changed by one of the operating system and the application operated in the operating system; and
invalidating a shadow code corresponding to the changed operation code,
wherein the fourth step executes the first step in place of the second step in a case of executing the changed operation code.

15. The data storage medium according to claim 12, further comprising the steps of:
detecting a shortage of a capacity of the memory necessary for holding the shadow code and the promotion code; and
selecting a shadow code having a longest unexecuted period among the generated shadow codes, and deleting the selected shadow code and a promotion code associated with the selected shadow code from the memory, wherein the fourth step executes the first step in place of the second step in a case of executing the deleted shadow code.

16. The data storage medium according to claim 12, wherein the third step includes the steps of:
- judging which of the operating system and the application operated in the operating system has requested the operation;
- holding frequency information with which specifying of the operation of a high frequency becomes possible;
- judging whether a type of the requested operation is contained in the held frequency information when the operating system has requested the operation of the hardware of the server system; and
- judging that a frequency of the requested operation higher than the predetermined threshold value when the type of the requested operation is contained in the held frequency information.

17. The data storage medium according to claim 12, wherein the third step includes the steps of:
- holding a number of execution times of an operation code belonging to each of predetermined address ranges in an instruction address space of the operation code for each of the predetermined address ranges;
- obtaining the number of execution times of all operation codes included in each of the address ranges to which the operation code for executing the requested operation belongs when the operation of the hardware of the server system is requested by one of the operating system and the application operated in the operating system; and
- judging that a frequency of the requested operation higher than the predetermined threshold value when the obtained number of execution times exceeds a predetermined threshold value.

18. The data storage medium according to claim 12, wherein the third step includes the steps of:
- judging which of the operating system and the application operated in the operating system has requested the operation;
- holding time information with which specifying of execution time of the operation becomes possible;
- calculating an interval between time information of execution time of the operation code for executing the requested operation and time information of previous execution time of the operation code for executing the requested operation when the operating system has requested the operation of the hardware of the server system; and
- judging that a frequency of the operation higher than the predetermined threshold value when the calculated interval is smaller than a predetermined threshold value.

19. The data storage medium according to claim 12, further comprising the steps of:
- receiving the predetermined judgment conditions entered by an administrator; and
- storing the received predetermined judgment conditions in a storage system.

20. The data storage medium according to claim 12, wherein the second step includes the steps of:
- inserting an emulation code for emulating the operation in the promotion code; and
- executing emulation of the operation of the hardware of the server system through execution of the emulation code in addition to the promotion code.

21. The data storage medium according to claim 12, wherein the second step includes the steps of:
- inserting the promotion code in the shadow code; and
- emulating the operation of the hardware of the server system through execution of the promotion code in addition to the shadow code.

* * * * *